United States Patent
Li et al.

(10) Patent No.: US 10,992,820 B2
(45) Date of Patent: Apr. 27, 2021

(54) METHODS AND APPARATUSES FOR SERVICE LAYER CHARGING CORRELATION WITH UNDERLYING NETWORKS

(71) Applicant: CONVIDA WIRELESS, LLC, Wilmington, DE (US)

(72) Inventors: Hongkun Li, Malvern, PA (US); Guang Lu, Thornhill (CA); Qing Li, Princeton Junction, NJ (US); Dale N. Seed, Allentown, PA (US); Lijun Dong, San Diego, CA (US); Chonggang Wang, Princeton, NJ (US); William Robert Flynn, IV, Schwenksville, PA (US); Xu Li, Plainsboro, NJ (US); Phillip Brown, Los Angeles, CA (US); Catalina M. Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/522,316

(22) PCT Filed: Oct. 27, 2015

(86) PCT No.: PCT/US2015/057528
§ 371 (c)(1),
(2) Date: Apr. 27, 2017

(87) PCT Pub. No.: WO2016/069571
PCT Pub. Date: May 6, 2016

(65) Prior Publication Data
US 2017/0339282 A1 Nov. 23, 2017

Related U.S. Application Data

(60) Provisional application No. 62/069,464, filed on Oct. 28, 2014.

(51) Int. Cl.
*H04M 15/00* (2006.01)
*H04W 4/70* (2018.01)
(Continued)

(52) U.S. Cl.
CPC ........ *H04M 15/66* (2013.01); *H04L 12/1403* (2013.01); *H04L 12/1407* (2013.01);
(Continued)

(58) Field of Classification Search
CPC ...... H04M 15/66; H04M 15/64; H04M 15/49; H04M 15/61; H04M 15/8083;
(Continued)

(56) References Cited

U.S. PATENT DOCUMENTS

| 10,194,469 B2* | 1/2019 | Bhalla ............... H04L 61/106 |
| 2007/0060101 A1 | 3/2007 | Duan |

(Continued)

FOREIGN PATENT DOCUMENTS

| CN | 101455064 A | 6/2009 |
| CN | 101945368 A | 1/2011 |

(Continued)

OTHER PUBLICATIONS

"OneM2M Mechanism to support establishment of charging policies", Dec. 9, 2013, XP055245421 pp. 1-11, InterDigital.*

(Continued)

*Primary Examiner* — Mehmood B. Khan
(74) *Attorney, Agent, or Firm* — BakerHostetler

(57) ABSTRACT

Mechanisms for service layer charging correlation are disclosed. Embodiments can include a Service Domain Charging Correlation Function (SD-CCF), which is responsible for interacting with underlying network and correlating (Continued)

charging information at service layer. Charging correlation information can be used to enable and facilitate the service layer charging correlation.

19 Claims, 26 Drawing Sheets

(51) Int. Cl.
*H04L 12/14* (2006.01)
*H04W 4/24* (2018.01)

(52) U.S. Cl.
CPC .......... *H04M 15/41* (2013.01); *H04M 15/49* (2013.01); *H04M 15/61* (2013.01); *H04M 15/62* (2013.01); *H04M 15/64* (2013.01); *H04M 15/8083* (2013.01); *H04W 4/24* (2013.01); *H04W 4/70* (2018.02); *H04M 2215/0192* (2013.01)

(58) Field of Classification Search
CPC ................. H04M 15/62; H04M 15/41; H04M 2215/0192; H04L 12/1407; H04L 12/1403; H04W 4/005; H04W 4/24; H04W 4/70
See application file for complete search history.

(56) References Cited

U.S. PATENT DOCUMENTS

| | | | | |
|---|---|---|---|---|
| 2008/0319884 | A1* | 12/2008 | Yi | G06Q 40/12 705/34 |
| 2013/0016657 | A1* | 1/2013 | Muhanna | H04W 80/04 370/328 |
| 2013/0265937 | A1* | 10/2013 | Jain | H04W 4/70 370/328 |
| 2013/0339104 | A1* | 12/2013 | Bose | G06Q 10/0637 705/7.37 |
| 2013/0343231 | A1 | 12/2013 | Foti | |
| 2014/0341041 | A1* | 11/2014 | Velev | H04W 4/70 370/236 |
| 2015/0023219 | A1* | 1/2015 | Jin | H04L 12/1403 370/259 |
| 2016/0112981 | A1* | 4/2016 | Ahn | H04W 4/029 455/500 |
| 2016/0234691 | A1* | 8/2016 | Jeong | H04W 12/0806 |
| 2017/0006455 | A1* | 1/2017 | Cho | H04W 4/70 |
| 2017/0026932 | A1* | 1/2017 | Yang | H04W 12/0806 |
| 2017/0237826 | A1* | 8/2017 | Wu | H04W 4/70 709/227 |
| 2019/0259097 | A1* | 8/2019 | Raleigh | G06Q 20/0855 |

FOREIGN PATENT DOCUMENTS

| | | |
|---|---|---|
| CN | 102006185 A | 4/2011 |
| CN | 103477587 A | 12/2013 |
| JP | 2010-213302 A | 9/2010 |
| WO | 2013/060387 A1 | 5/2013 |

OTHER PUBLICATIONS

"OneM2M Mechanism to support establishment of charging policies", Dec. 9, 2013, XP055245421 pp. 1-11, InterDigital (Year: 2013).*

3rd Generation Partnership Project; (3GPP) TR 23.813 V11.0.0; "3rd Generation Partnership Project; Technical Specification Group Services and System Aspects; Study on Policy Solutions and Enhancements (Release 11)", Jun. 2011, 41 pages.
3rd Generation Partnership Project; (3GPP) TR 23.862 V12.0.0, "3rd Generation Partnership Project; Technical Specification Group Services and System Aspects; Evolved Packet Core (EPC) enhancements to support interworking with data application providers; Stage 2 (Release 12)" Dec. 2013, 23 pages.
3rd Generation Partnership Project; (3GPP) TS 29.214 V11.7.0, 3rd Generation Partnership Project; Technical Specification Group Core Network and Terminals; Policy and Charging Control over Rx Reference Point (Release 11), Dec. 2012, 53 pages.
3rd Generation Partnership Project; (3GPP) TS 23.203 V12.0.0, 3rd Generation Partnership Project; Technical Specification Group Services and System Aspects; Policy and Charging Control Architecture (Release 12), Mar. 2013, 183 pages.
3rd Generation Partnership Project; (3GPP) TS 23.682 V11.3.0, 3rd Generation Partnership Project; Technical Specification Group Services and System Aspects; Architecture enhancements to facilitate communications with packet data networks and applications (Release 11), Dec. 2012, 29 pages.
3rd Generation Partnership Project; 3GPP TS 29.368 V11.2.0, 3rd Generation Partnership Project; Technical Specification Group Core Network and Terminals; Tsp interface protocol between the MTC Interworking Function (MTC-IWF) and Service Capability Server (SCS) (Release 11), Mar. 2013, 21 pages.
3rd Generation Partnership Project; 3GPP TS 32.240 V12.0.0, 3rd Generation Partnership Project; Technical Specification Group Services and System Aspects; Telecommunication management; Charging management; Charging architecture and principles (Release 12), Mar. 2013, 45 pages.
3rd Generation Partnership Project; 3GPP TS 32.260 V9.2.0, 3rd Generation Partnership Project; Technical Specification Group Service and System Aspects; Telecommunication management; Charging management; IP Multimedia Subsystem (IMS) charging (Release 9), Dec. 2009, 112 pages.
3rd Generation Partnership Project; 3GPP TS 32.296 V12.2.0, 3rd Generation Partnership Project; Technical Specification Group Services and System Aspects; Telecommunication Management; Charging Management; Online Charging System (OCS): Applications and Interfaces (Release 12), Sep. 2014, 94 pages.
European Telecommunications Standards Institute (ETSI) TS 102 690 V2.1.1, Machine-to-Machine Communications (M2M); Functional Architecture, Oct. 2013, 332 pages.
Open Mobile Alliance (OMA) "Charging Architecture", Approved Version 1.1 Oct. 9, 2012, 14 pages.
OneM2M "oneM2M Functional Architecture Baseline Draft", TS-0001 V0.8.0, Technical Specification, Jun. 30, 2014, 338 pages.
OneM2M TS-0001 V-2014-08 OneM2M Functional Architecture Baseline Draft, Aug. 1, 2014, 297 pages.
OneM2M "oneM2M Requirements Technical Specification", TS-0002-V-0.6.2, Oct. 17, 2013, 29 pages.
OneM2M TS-0007 V0.3.0, "Service Component Architecture" Jun. 17, 2014, 105 pages.
OneM2M WG2-Arc, "Mechanism to Support Establishment of Charging Policies", Dec. 9, 2013, http://ftp.onem2m.org/meetings/Arc/2013meetings/20131209_ARC8.0_Miyazaki/oneM2M-Arc-2013-0564-discussion_slides_on_SCA_CSF.
International Patent Application No. PCT/US2015/057528: International Preliminary Report dated May 11, 2017, 7 pages.

* cited by examiner

USER INTERFACE — 2302

Set/View charging correlation rules
ruleID = value 1
creatorID = value 2
creatorType = value 3
policyCorrelationEnabled = value 4
infoCorrelationEnabled = value 5
serviceID = value 6
ruleStatus = value 7
chargingCorrelationTriggerID = value 8

Set/View charging correlation trigger
triggerID = value A
triggerType = value B
triggerSubType = value C
relatedChargingPolicyID = value D
relatedChargeableEventID = value E
underlyingNetworkType serviceID = value F

FIG. 23A

USER INTERFACE — 2304 remaining free bandwidth
For sponsored flow

20% 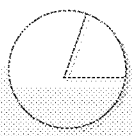

FIG. 23B

METHODS AND APPARATUSES FOR SERVICE LAYER CHARGING CORRELATION WITH UNDERLYING NETWORKS

CROSS-REFERENCE TO RELATED APPLICATIONS

This application is a National Stage Application filed under 35 U.S.C. § 371 of International Application No. PCT/US2015/057528, filed Oct. 27, 2015, which claims priority to U.S. Provisional Patent Application No. 62/069,464, filed Oct. 28, 2014, the disclosure of which is incorporated herein by reference in its entirety.

BACKGROUND

The 3rd Generation Partnership Project (3GPP) covers cellular telecommunications network technologies, including radio access, the core transport network, and service capabilities. The latest version of the 3GPP mobile core network (MCN) architecture for wireless communications is referred to as the Evolved Packet Core (EPC). The Evolved Packet Core (EPC) has a "flat architecture" to handle the data traffic efficiently from performance and cost perspective. EPC also separates the user data (also known as the user plane) and the signaling (also known as the control plane) to make the EPC scale independent.

The 3GPP network Policy and Charging Control (PCC) system provides dynamic control of policy and charging per subscriber and per IP data flow. It supports finer QoS control to enable application servers to dynamically control the Quality of Service (QoS) and charging policies for the services delivered.

FIG. 1 is a diagram that illustrates the PCC architecture 100 that consists of a number of functions with specified interfaces between them. The Policy and Charging Rules Function (PCRF) 102 is responsible to manage Policy and Charging for IP-CAN sessions, IP-CAN bearers or Service Data Flows (SDFs). Policy and Charging Enforcement Function (PCEF) 104 encompasses service data flow detection, policy enforcement and flow based charging functionalities. 3GPP network supports both Offline and Online Charging. Offline Charging System (OFCS) 106 is a mechanism where charging information does not affect, in real-time, the service rendered, such as post-paid subscribers. OFCS 106 includes Charging Data Function (CDF) and Charging Gateway Function (CGF). CDF uses the information received from Charging Trigger Function (CTF) to construct Charging Data Records (CDRs). CGF acts as a gateway between the 3GPP network and the Billing Domain to transfer CDRs. On the contrary, the Online Charging System (OCS) 108 performs charging functions, e.g. credit control in real-time. This allows the OCS 108 to affect service execution in real-time, typically for pre-paid subscribers. Various charging models are supported by 3GPP network, such as volume-based, time-based, volume- and time-based, event-based, and no charging.

From a protocol stack perspective, service layers are typically situated above the application protocol layer and provide value added services to client applications. Hence service layers are often categorized as 'middleware' services. For example, FIG. 2 is a diagram that illustrates an exemplary service layer 202 between an IP network stack 204 and applications 206.

An M2M/IoT service layer is an example of one type of service layer specifically targeted towards providing value-added services for M2M/IoT type devices and applications. Recently, several industry standards bodies (e.g., oneM2M) have been developing M2M/IoT service layers to address the challenges associated with the integration of M2M/IoT types of devices and applications into deployments such as the Internet/Web, cellular, enterprise, and home network.

An M2M service layer can provide applications and devices access to a collection of M2M-oriented capabilities supported by the service layer. A few examples include security, charging, data management, device management, discovery, provisioning, and connectivity management. These capabilities are made available to applications via APIs which make use of message formats, resource structures and resource representations defined by the M2M service layer.

oneM2M is a new standard to develop technical specifications which address the need for a common M2M Service Layer that can be readily embedded within various hardware and software, and relied upon to connect a wide variety of devices in the field with M2M application servers worldwide.

FIG. 3 is a diagram that illustrates a oneM2M common services layer 302 that supports a set of Common Service Functions (CSFs) (i.e. service capabilities). An instantiation of a set of one or more particular types of CSFs is referred to as a Common Services Entity (CSE) 304 which can be hosted on different types of network nodes (e.g. infrastructure node, middle node, application-specific node).

oneM2M is developing the service layer in two architectural approaches. FIG. 4 is a diagram that illustrates a RoA (Resource Oriented Architecture) architecture for oneM2M. A resource is a uniquely addressable element in the architecture having a representation that can be manipulated via RESTful methods such as Create, Retrieve, Update, and Delete. These resources are made addressable using a Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

FIG. 5 is a diagram that illustrates a SoA (Service Oriented Architecture) for oneM2M. The SoA architecture is being developed to consider legacy deployment that is not RESTful based. It re-uses largely the same service layer functional architectural. The service layer contains various M2M services, and multiple services can be grouped into service components. In addition to existing reference points, it introduced the inter-service reference point Msc. Communication between M2M Service Components which pass over the Msc reference point utilizes a web services approach, e.g., Web Services Message Exchange Patterns (MEP).

Looking again at FIG. 3, the Mcn reference point is designed for communication flows between a Common Services Entity (CSE) 304 and the Underlying Network Services Entity (NSE) 306. These flows enable a CSE 304 to use the supported services (other than transport and connectivity services) provided by the Underlying NSE 306.

Communications between the CSEs 304 and the NSEs 306 across the Mcn reference point include:
  CSE(s) accessing network service functions provided by Underlying Networks; and
  Optimizing network service processing for Underlying Networks.

Such services normally are more than just the general transport services.

Communications which pass over the Mcn reference point to Underlying Networks include:

Messaging services that are widely deployed by Applications and network operators using a number of existing mechanisms.

Network APIs defined by other SDOs (e.g. OMA and GSMA) are used by network operators for their services.

Interworking for services and security aspects for MTC (Machine Type Communications) has been defined by 3GPP network.

A Service Charging and Accounting (SCA) CSF 308 defined by oneM2M is responsible for dealing with all charging and accounting issues. Table 1 shows the charging requirements related to the charging correlation, however these requirements are not fully addressed in current oneM2M specifications.

TABLE 1 oneM2M Requirements for Charging Correlation

| Requirement ID | Description |
| --- | --- |
| CHG-002 | The M2M system shall support mechanism to facilitate correlation (e.g. subscriber identity) of charging information collected for different services, including those provided by the underlying network operator. |
| CHG-004 | The M2M system shall support transfer of the charging information records to the Billing Domain of the M2M Service Provider, for the purpose of: Subscriber billing Inter-provider billing Provider-to-subscriber accounting including additional functions like statistics. |

SUMMARY

Mechanisms for service layer charging correlation are disclosed. Exemplary mechanisms describe how the service layer interacts with underlying networks regarding charging correlation information and how to perform the charging correlation at service layer.

Embodiments can include a Service Domain Charging Correlation Function (SD-CCF), which is responsible for interacting with underlying network and correlating charging information at service layer. Charging correlation information can be used to enable and facilitate the service layer charging correlation. Procedures for SD-CCF can be used to interact with the underlying network to facilitate charging correlation at the service layer.

A oneM2M embodiment shows how the proposed SD-CCF can work with a 3GPP network for performing service layer charging correlation. The existing service layer charging does not include any mechanism of performing charging correlation at the service layer. Specifically, the existing service layer charging does not have a mechanism to obtain the charging related information for correlation from underlying network and how to do the charging correlation at the service layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

A more detailed understanding may be had from the following description, given by way of example in conjunction with accompanying drawings wherein:

FIG. 23A-B are diagrams that illustrate exemplary interfaces of one embodiment.

DETAILED DESCRIPTION OF ILLUSTRATIVE EMBODIMENTS

Figure 1:
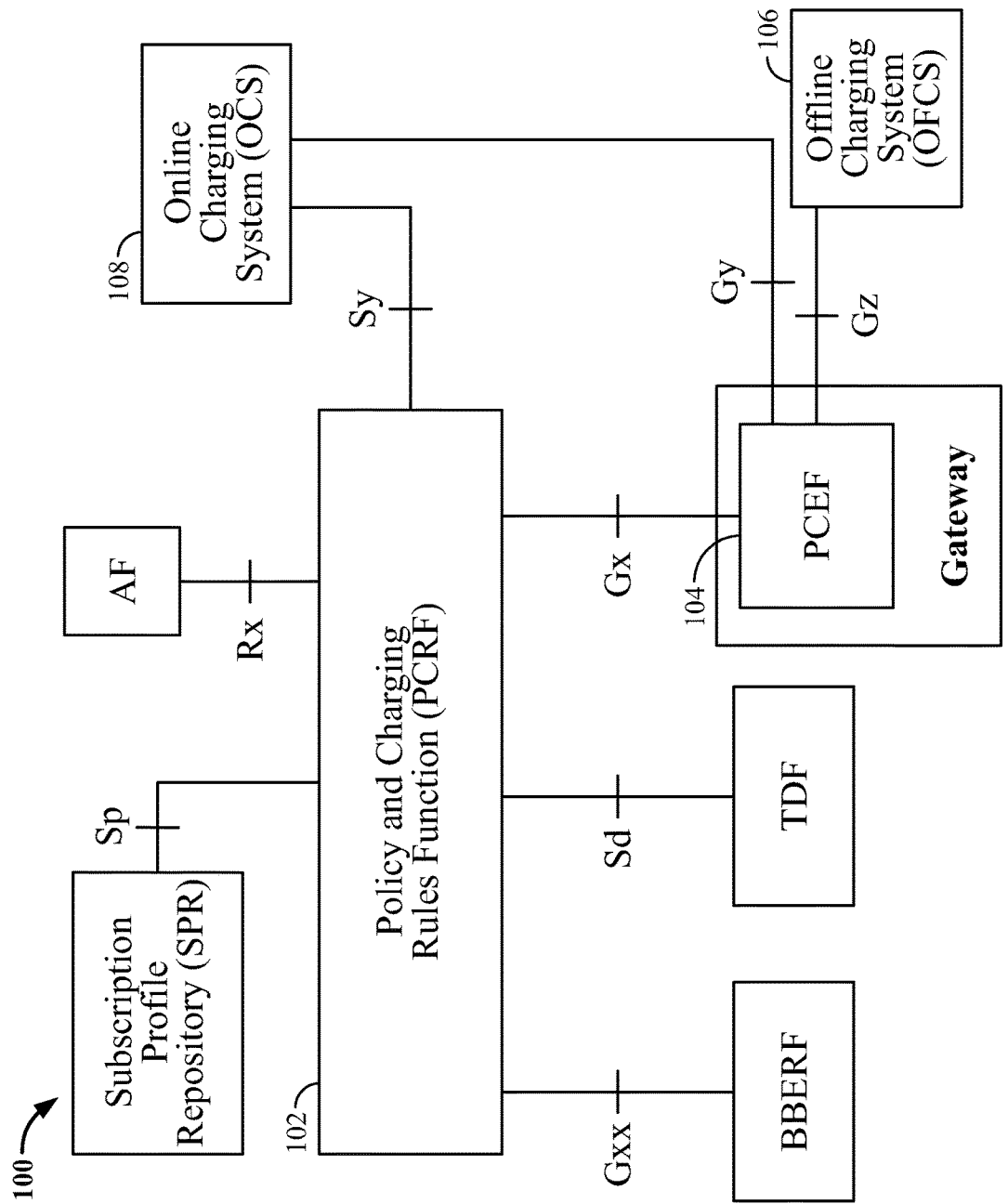
FIG. 1 is a diagram that illustrates a 3GPP network Policy and Charging Control (PCC) architecture.
Figure 2:
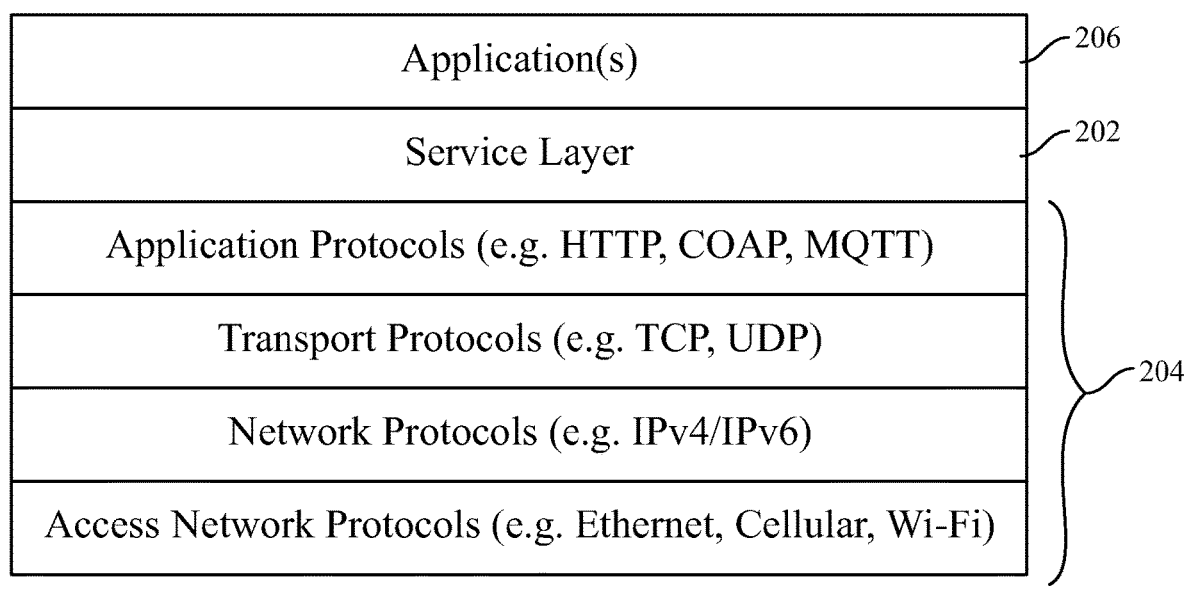
FIG. 2 is a diagram that illustrates an exemplary service layer between an IP network stack and applications.
Figure 3:
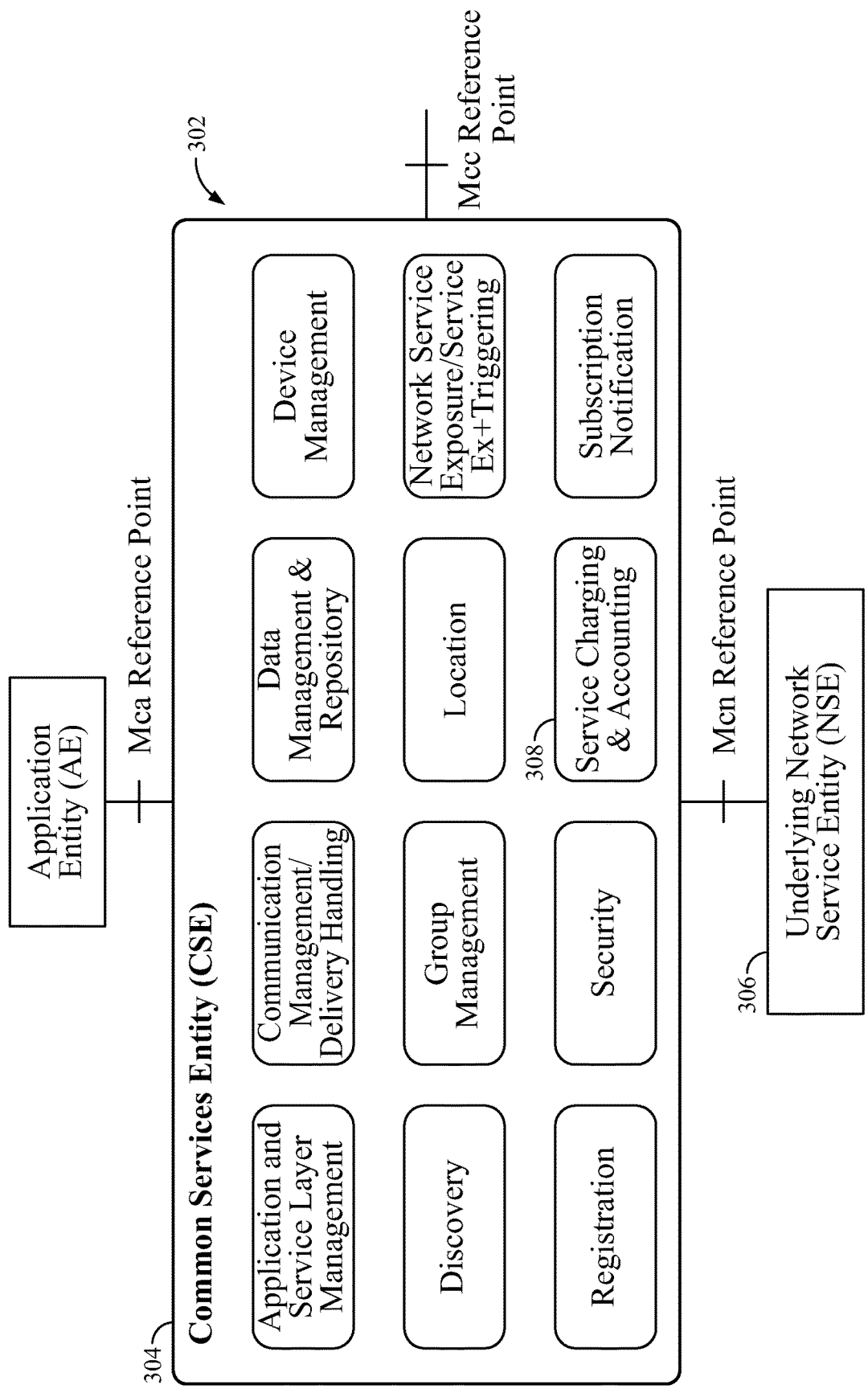
FIG. 3 is a diagram that illustrates a oneM2M common services layer that supports a set of Common Service Functions (CSFs) (i.e. service capabilities).
Figure 4:
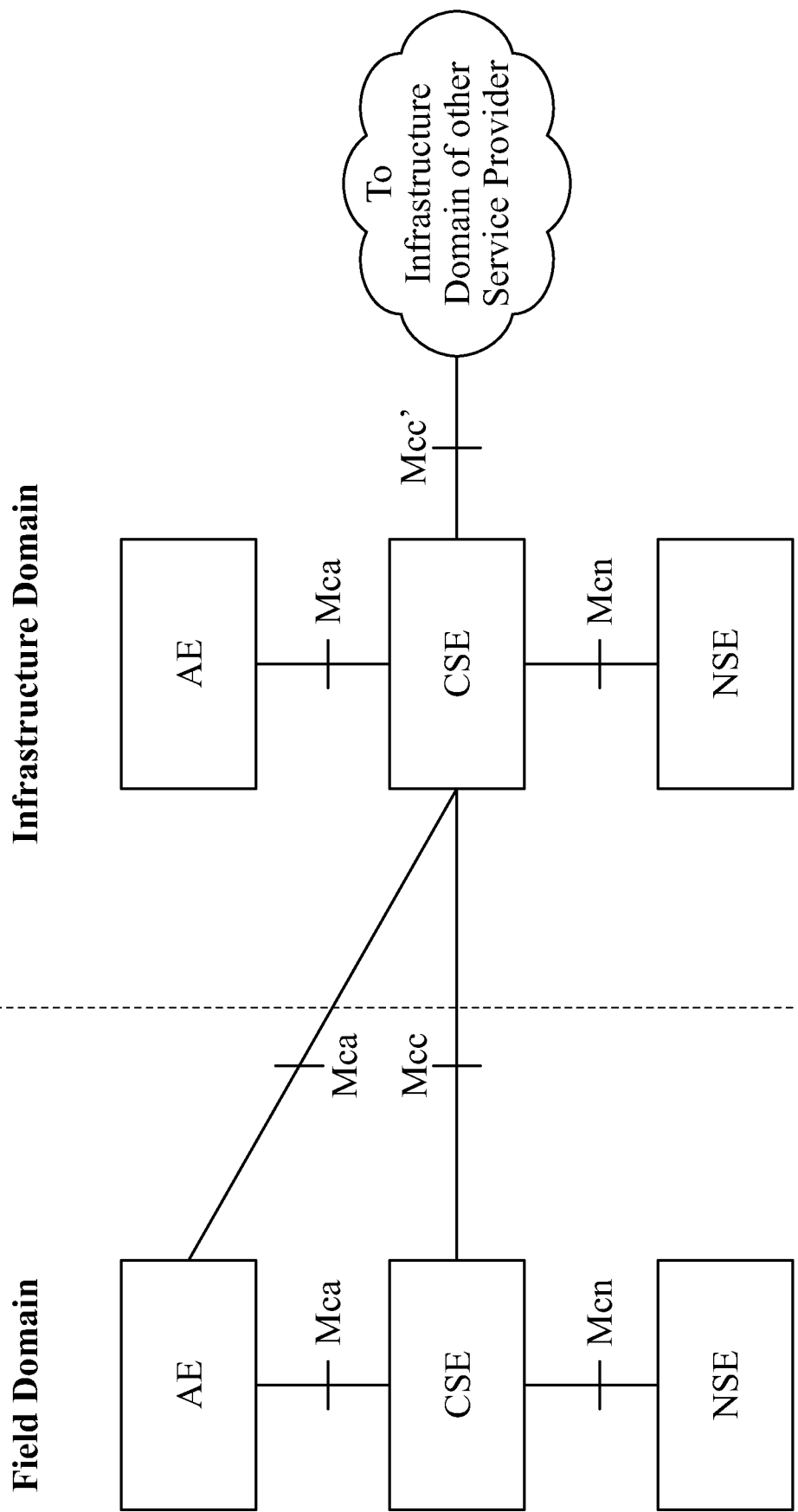
FIG. 4 is a diagram that illustrates a RoA (Resource Oriented Architecture) architecture for oneM2M.
Figure 5:
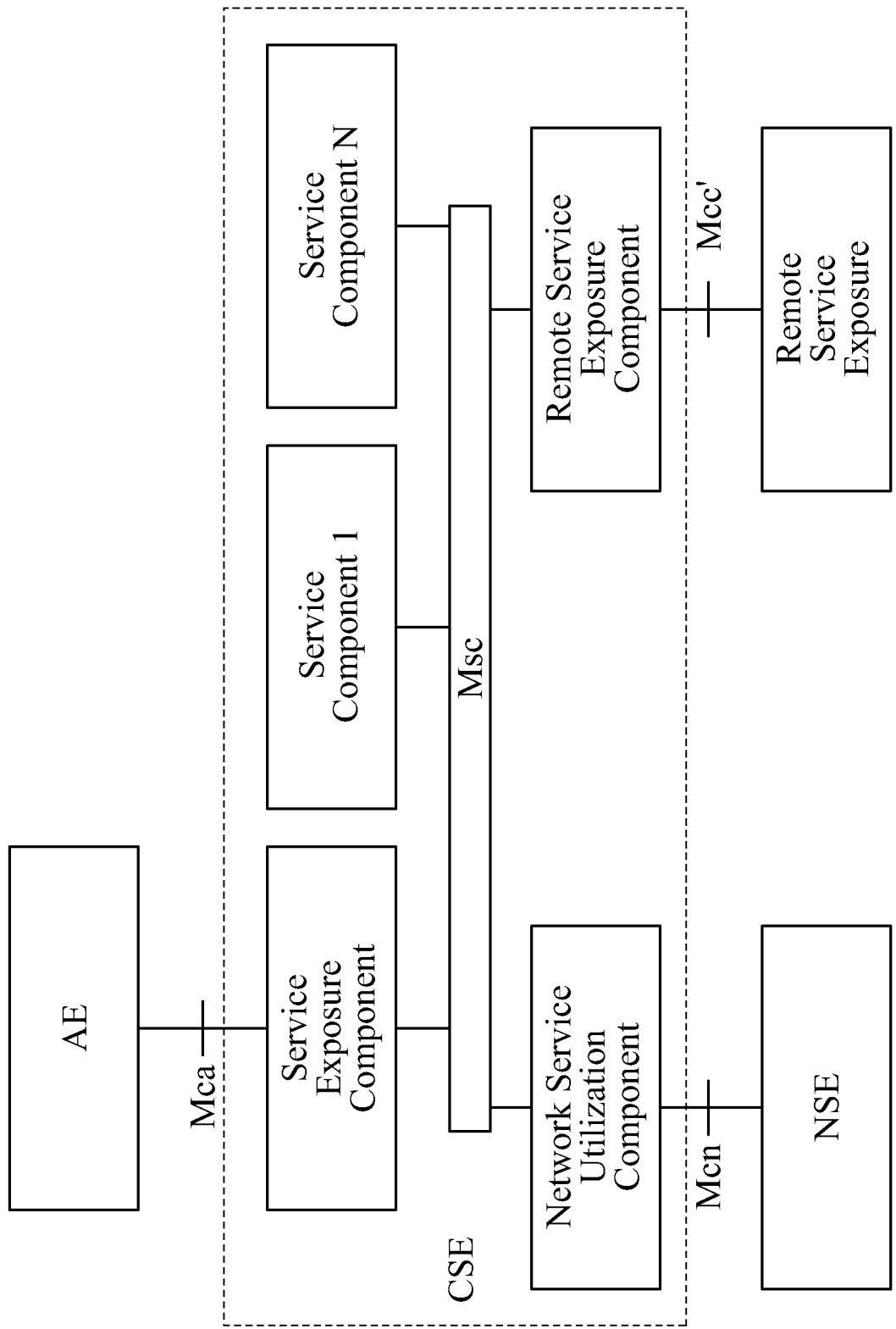
FIG. 5 is a diagram that illustrates a SoA (Service Oriented Architecture) for oneM2M.
Figure 6:
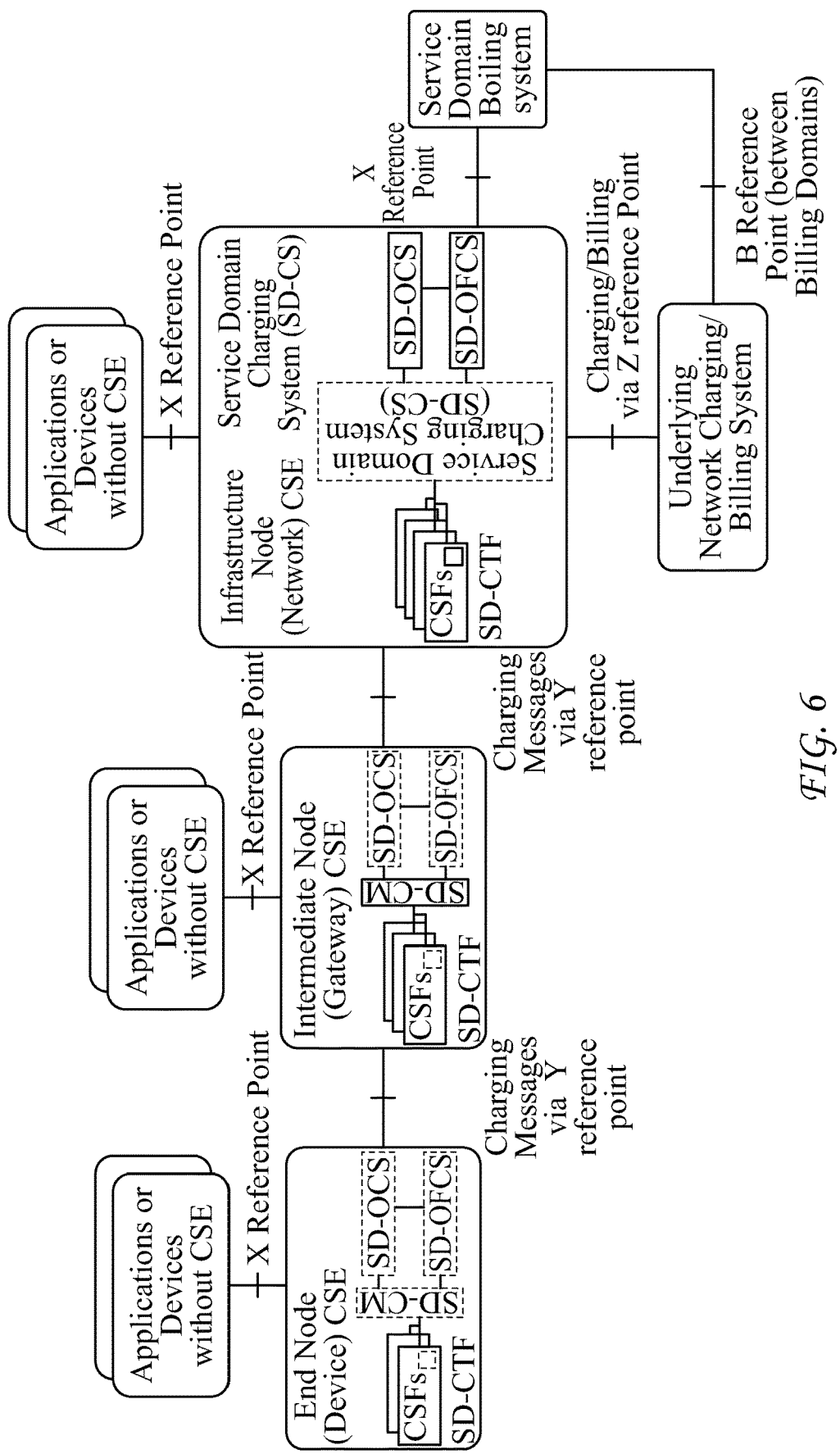
FIG. 6 is a diagram of an architecture of a service domain charging system.

FIG. 6 is a diagram of architecture of a service domain charging system, which enables service layer to perform service layer charging independent of the underlying network. Specifically, the Service Domain Charging Management (SD-CM) 604 is the center of Service Domain Charging System (SD-CS) 602. The SD-CM 604 manages and maintains the charging policies, serves as the aggregator and dispatcher of the charging information, and acts as anchor point of interactions among SD-CS in different nodes. Service Domain Offline Charging System (SD-OFCS) 606 receives offline charging events from SD-CM 604 and generates Service Domain Charging Data Records (SD-CDRs). Service Domain Online Charging System (SD-OCS) 608 receives service requests, checks the credit and grants the services. SD-OCS 608 can maintain the credit information for different service subscribers.

Figure 7A:
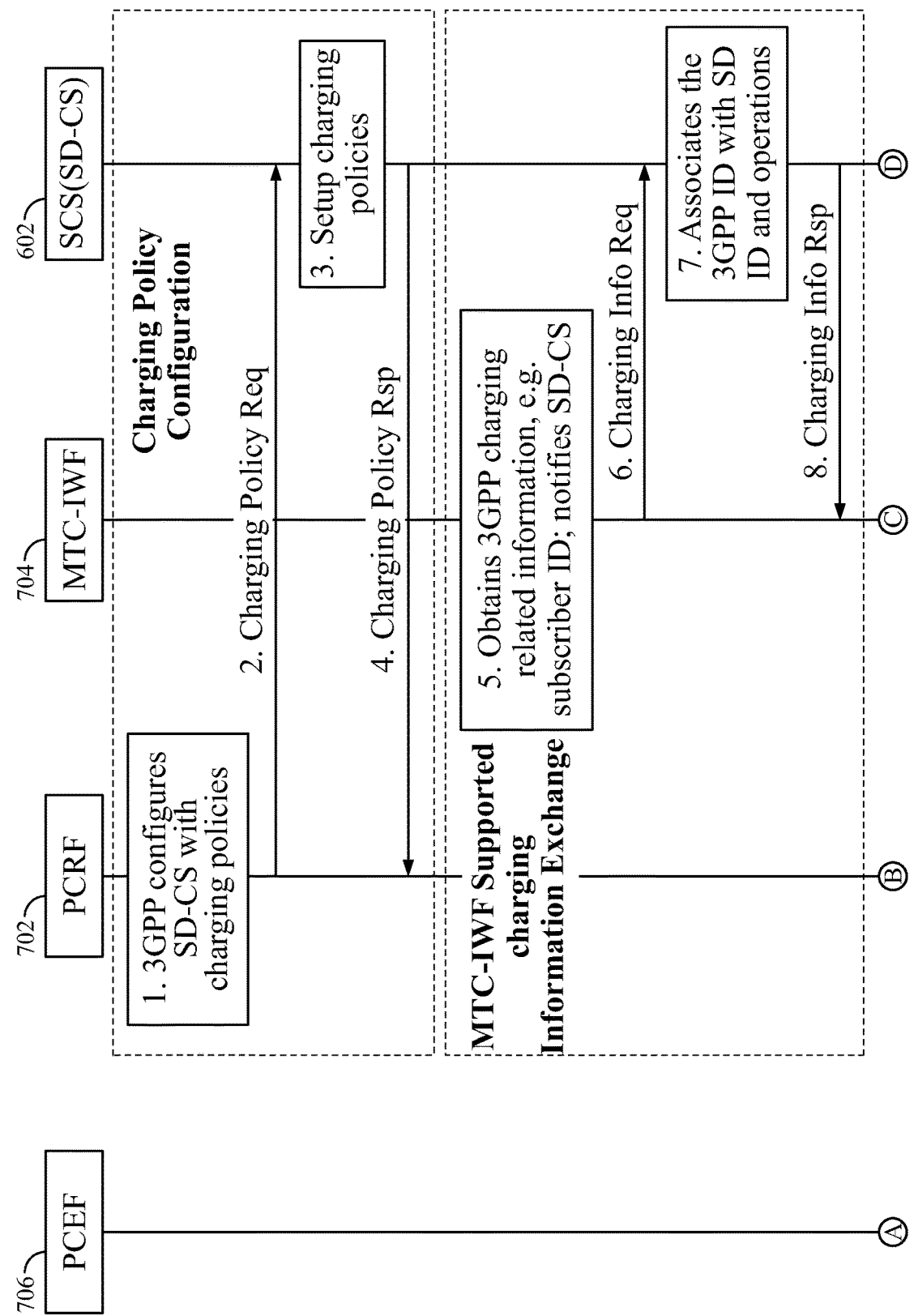
FIG. 7A-B is a diagram that illustrates an exemplary message exchange procedure between 3GPP network and service layer.
Figure 7B:
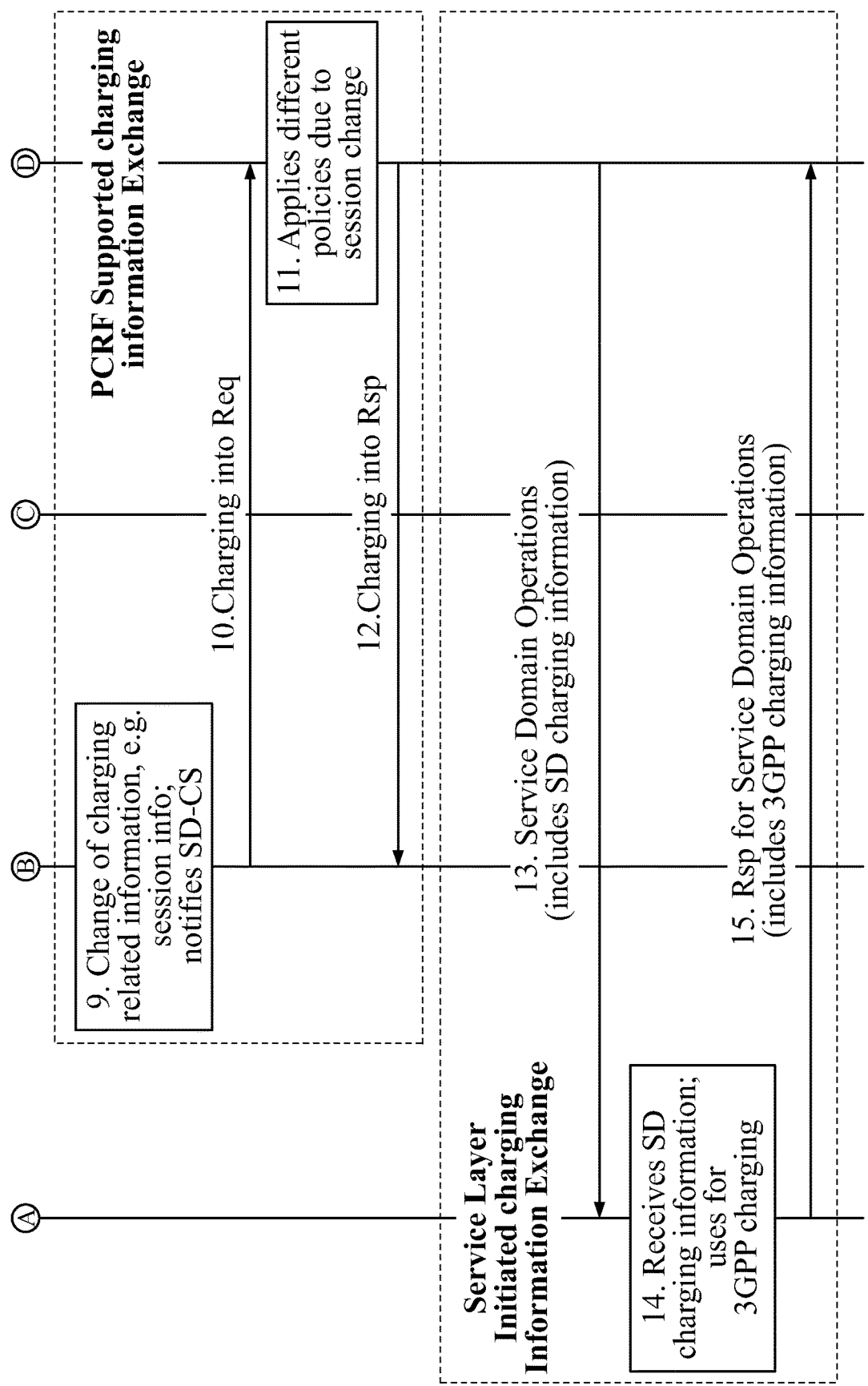

FIG. 7A-B is a diagram that illustrates an exemplary message exchange procedure between 3GPP network and service layer (i.e. SD-CS 602 shown in FIG. 6). The procedures shown in the figure do not have to happen in the sequence as shown in the figure. Such interactions provide more integrated charging between 3GPP network and the service domain.

In steps 1-4 of FIG. 7A-B, in one deployment scenario, the 3GPP network charging system may be in control of SD-CS 602. The 3GPP network charging policy entity PCRF 702 sends charging policy configuration for SD-CS 602 via Rx reference point. The SD-CS 602 configures its charging policy based on input from the 3GPP network charging system.

Steps 5-8 of FIG. 7A-B show an example in which the MTC-IWF 704 sends 3GPP network charging information to the SD-CS 602 via the Tsp reference point. For example, the MTC-IWF 704 has 3GPP subscriber information and the SD-CS 602 can associate the 3GPP network ID with the service domain IDs.

In steps 9-12 of FIG. 7A-B, PCRF 702 can pass 3GPP network charging related information to SD-CS 602, such as session status. The SD-CS 602 takes actions according to its policies. For example, SD-CS 602 may apply different rates when a 3GPP network session has been handed over to another access technology.

In steps 13-15 of FIG. 7A-B, in another embodiment, the SD-CS 602 may be in control of message exchange, where the SD-CS 602 can attach service domain charging information in the service domain operation messages over the user plane reference point Gi/SGi to PCEF 706. Charging is performed at PCEF 706 and the information is sent back to SD-CS 602 over the user plane, and PCRF 702 may be updated accordingly by PCEF 706 if needed.

Figure 8:
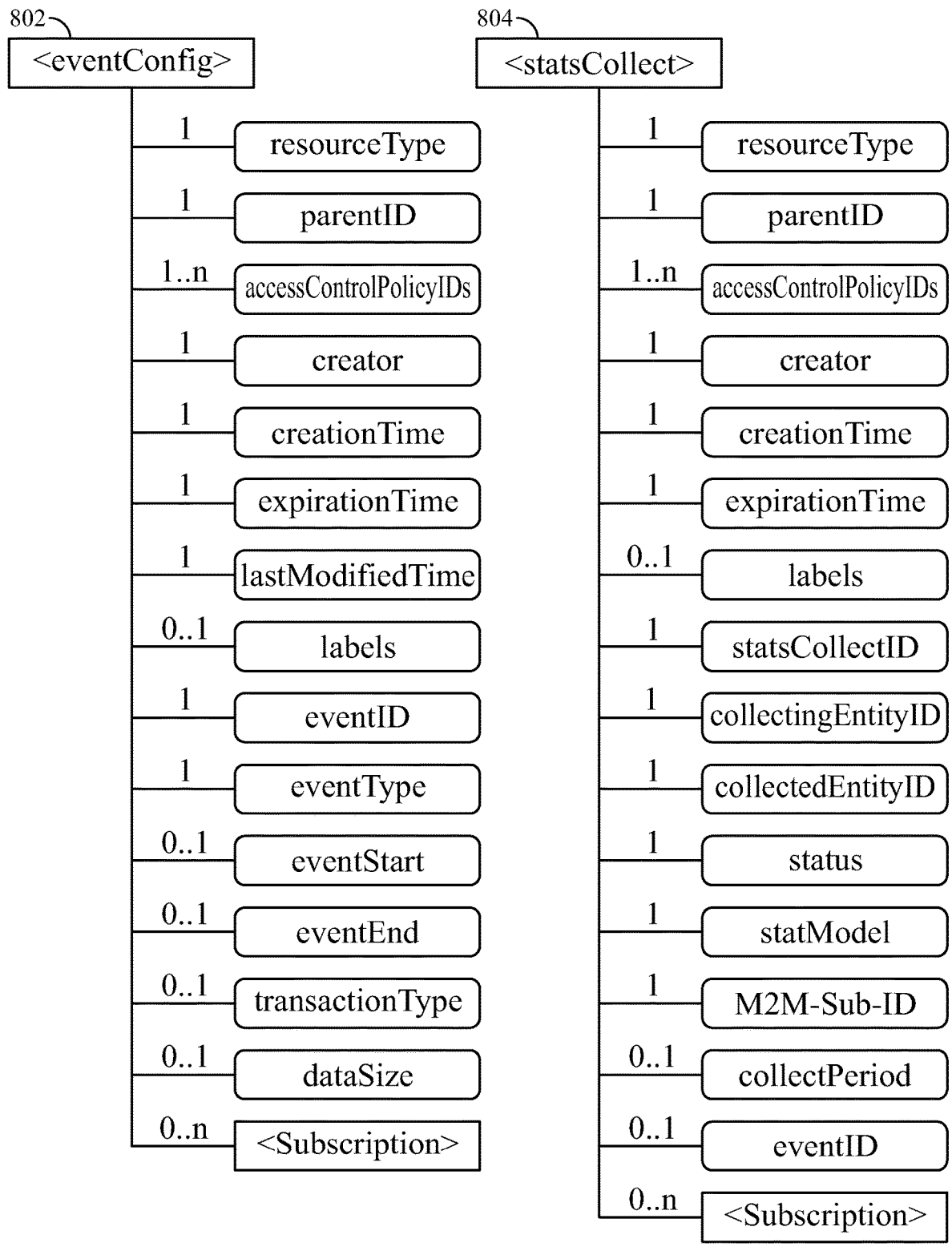
FIG. 8 are diagrams that illustrate an <eventConfig> resource and <statsCollect> resource.
Figure 22A:
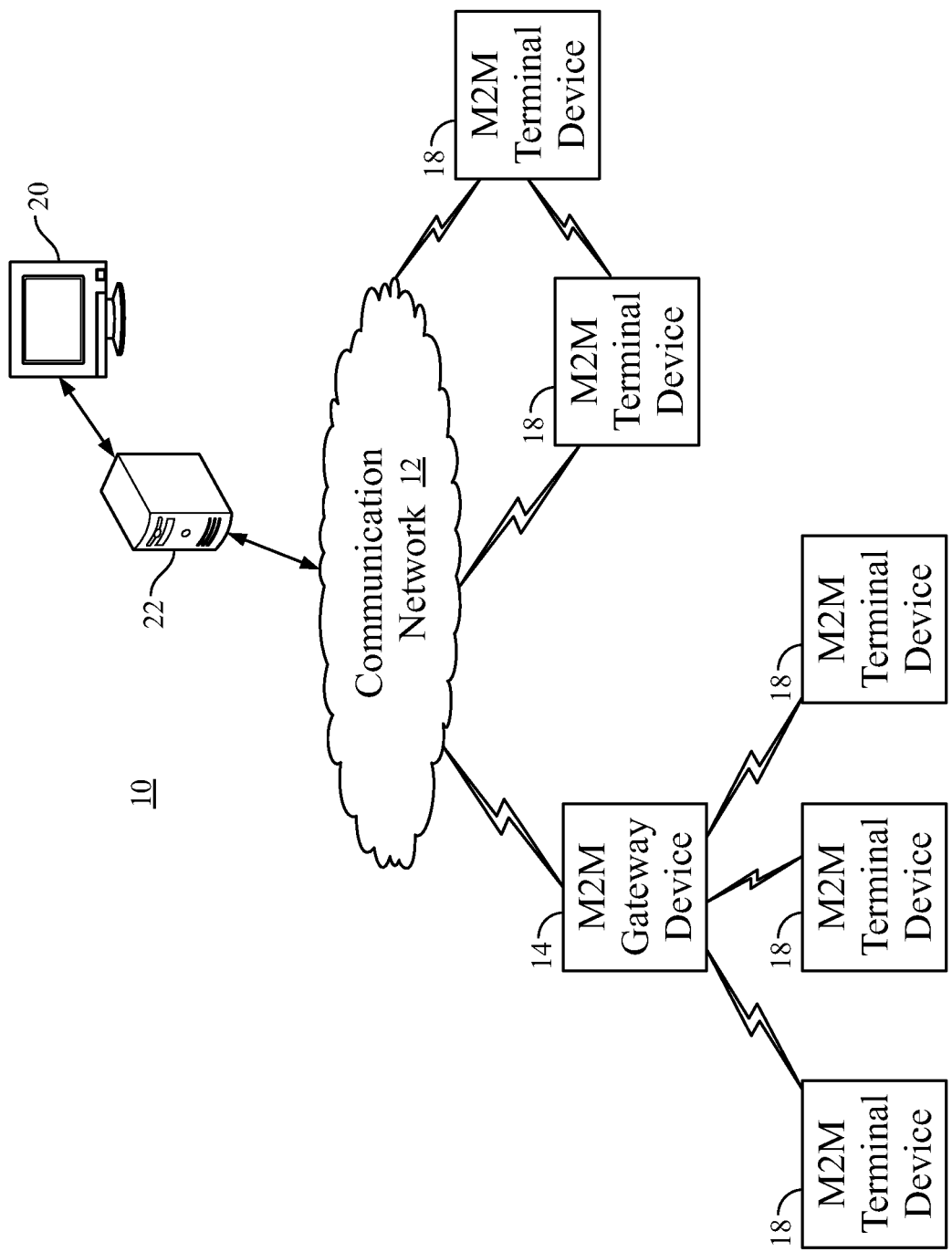
FIG. 22A is a diagram of an example machine-to machine (M2M) or Internet of Things (IoT) communication system in which one or more disclosed embodiments of IoT event management systems and methods may be implemented.
Figure 22B:
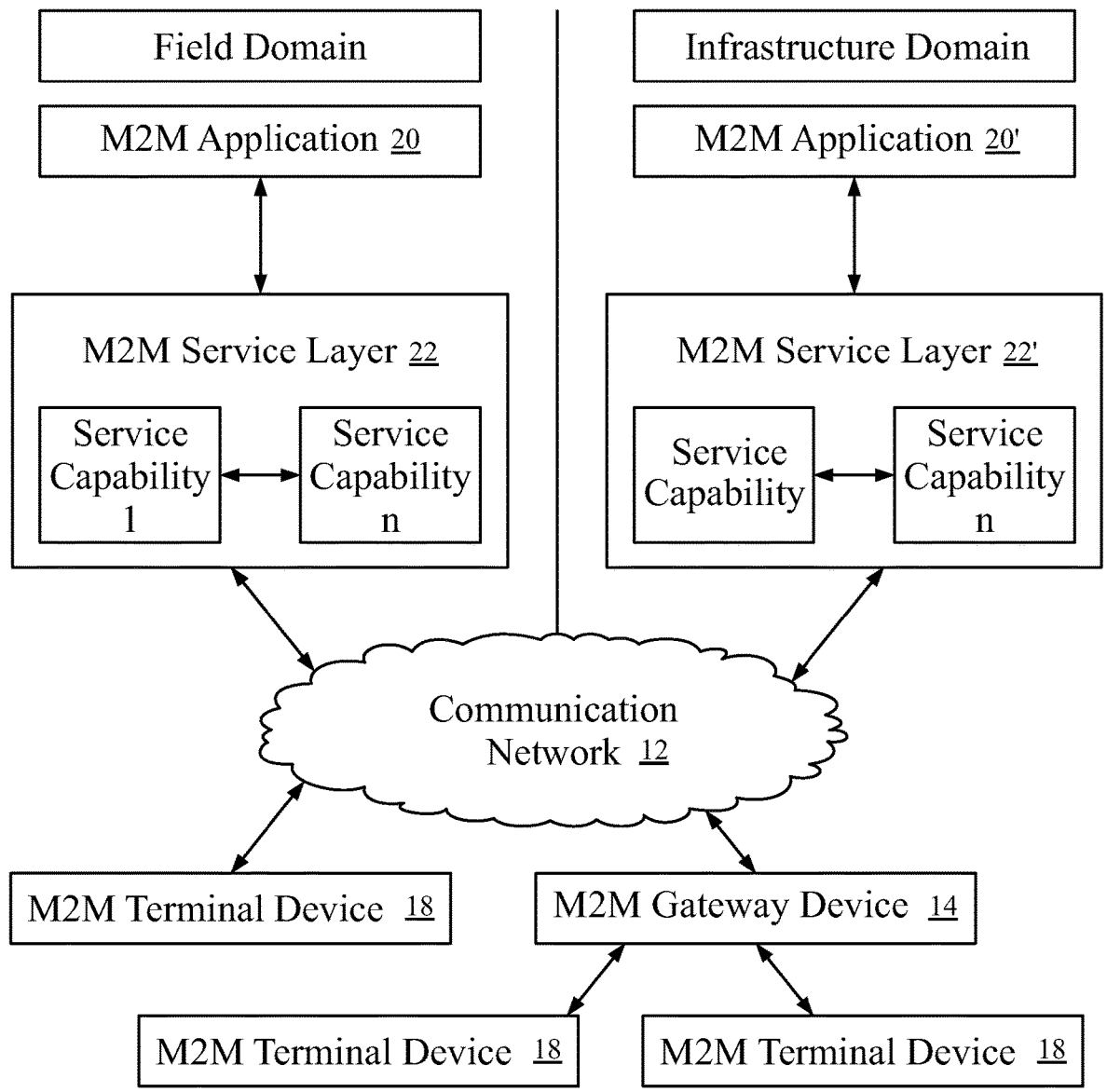
FIG. 22B is a system diagram of an example architecture that may be used within the M2M/IoT communications system illustrated in FIG. 22A
Figure 22C:
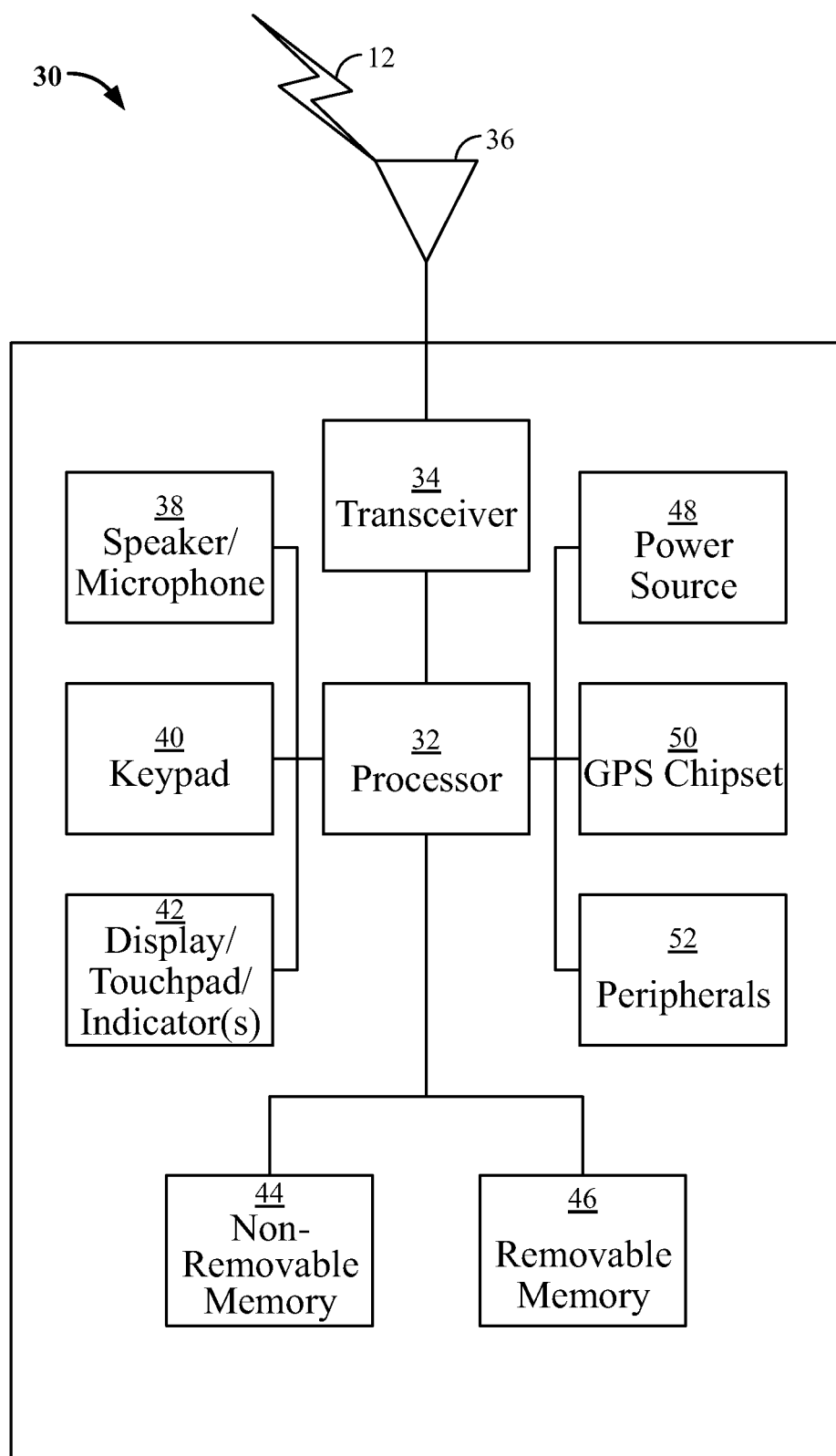
FIG. 22C is a system diagram of an example M2M/IoT terminal or gateway device that may be used within the communications system illustrated in FIG. 22A.
Figure 22D:
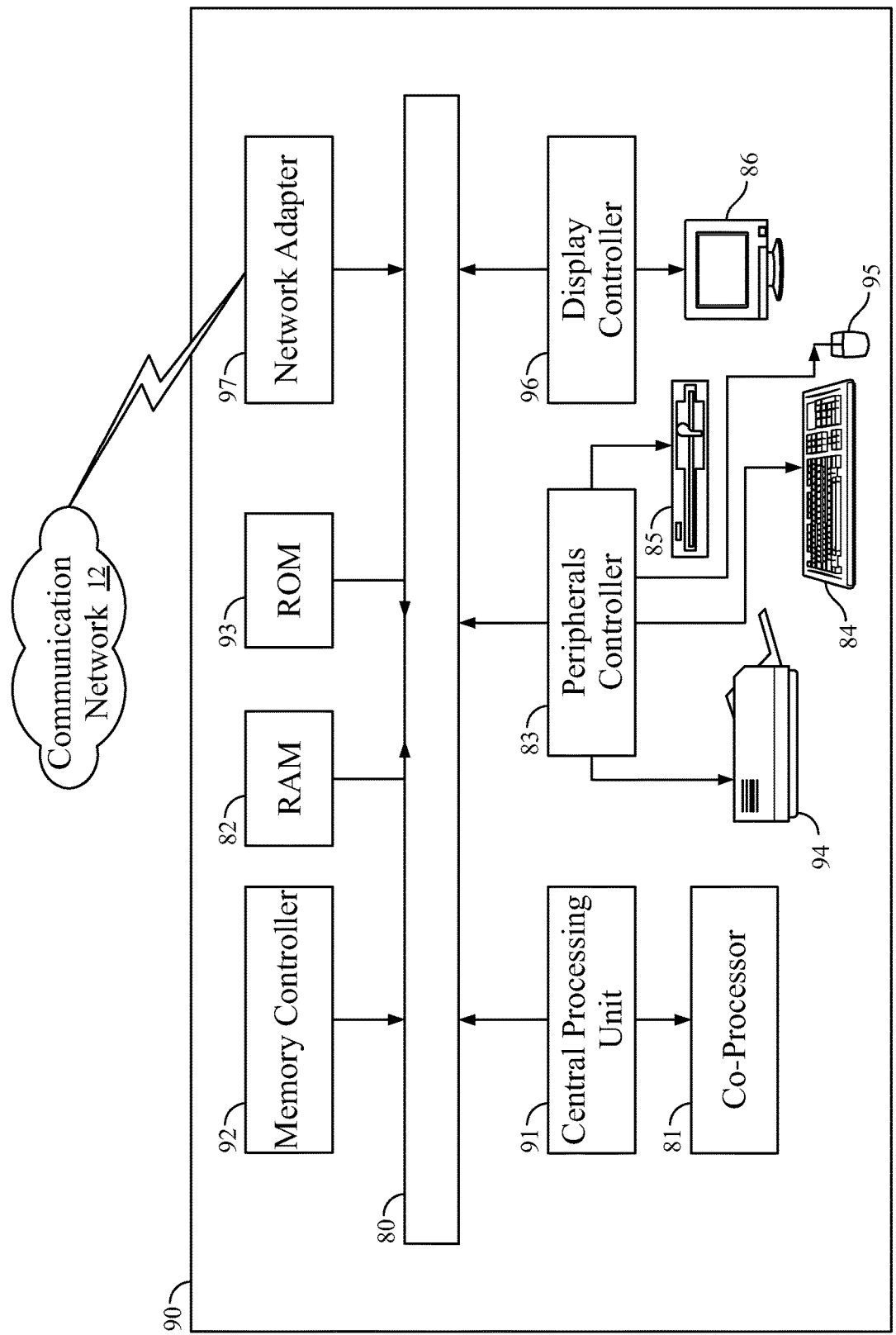
FIG. 22D is a block diagram of an example computing system in which aspects of the communication system of FIG. 22A may be embodied.

It is understood that the entities performing the steps illustrated in FIG. 7A-B are logical entities that may be implemented in the form of software (i.e., computer-executable instructions) stored in a memory of, and executing on a processor of a node, device, server, or other computer system such as one of those illustrated in FIG. 22C or 22D. That is, the method(s) illustrated in FIG. 7A-B may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 7A-B. It is also understood that any transmitting and receiving steps illustrated in FIG. 7A-B may be performed by communication circuitry of the node under control of the processor of the node and the computer-executable instructions (e.g., software) that it executes. In addition, current oneM2M specification defines <eventConfig> resource 802 and <statsCollect> resource 804 to record and maintain the charging policy and charging record information respectively, as shown in FIG. 8. Specifically, <eventConfig> resource 802 maintains the chargeable events with detailed information; and <statsCollect> resource 804 maintains the specific charging policy with attributes indicating the properties of a charging policy.

3GPP network introduces the concept of charging correlation in some specifications. In one embodiment, the charging data correlation is defined as combining charging events generated by Charging Trigger Function (CTF) while they belong to the same bearer/session/service resource usage. The correlation provides an association of charging information for the mobile subscriber's resource usage. In addition, the Inter Operator Identification concept (IOI) is introduced for inter-network correlation to enable the different operators involved in IMS sessions to identify each other.

In another specification, charging correlation is discussed between 3GPP core network and IMS. However, the correlation there only focuses on ID mapping/association across the two networks.

Open Mobile Alliance (OMA) defines the concept of charging correlation: Correlation could occur between the Charging Events generated by different entities while they are collaboratively providing a single service. The correlation function can provide an association of events for the user/application that will be charged. This correlation focuses on the charging operations within OMA perspective instead of inter-network correlation.

Service layer charging correlation is a broader concept of dynamically adjusting the service layer charging behavior based on the charging correlation information provided by the underlying network.

Service provider charges the service subscriber based on the transactions related to service layer operations (e.g. sensor data reading, data retrieval); while underlying network charges the service subscriber based on transport of data flow. The operations at the two layers are correlated, for example, the data retrieval operation at service layer would also involve the data transport at the underlying transport layer. Therefore it is necessary for service layer and underlying network to correlate the same charging related information.

Figure 9:
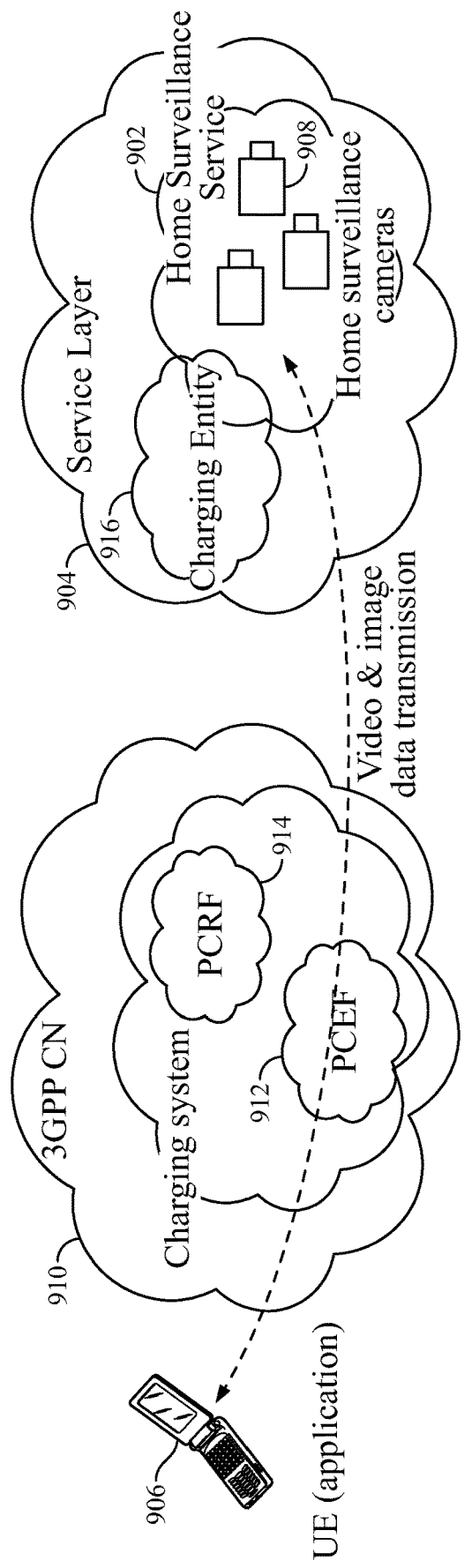
FIG. 9 is a diagram that shows an exemplary architecture of one embodiment.

A service provider, Company A, provides a Home Surveillance service 902 through its service layer platform 904 as shown in FIG. 9. A service subscriber, when travelling from home, would like to use the application installed on user equipment (UE) 906, such as a cell phone or tablet, to monitor his house, via the cameras 908 fixed inside and outside the house. In the case that the service subscriber requests the camera 908 through his cell phone 906 for image/video transmission, the camera 908 can automatically start transmission of images/video captured by the camera

908. The camera 908 may also be able to initiate an audio/video call or send messages for alarm addressing to the cell phone 906 of the service subscriber in the case there are abnormal (e.g. intruders) images captured by the camera.

Service provider (i.e., company A) would like to do the charging separated from the underlying access network. The service subscriber pays a monthly service subscription fee, which includes, for example, free 1 Gbytes data for transmission of images/video through 3GPP network 910. The service provider pays for the 3GPP network data based on the agreement with 3GPP network operator. Once the data volume exceeds 1 Gbytes, the service provider will pay an additional fee to the 3GPP network operator, and correspondingly charge an extra fee to the service subscriber. This new charging model is called sponsored data connectivity, which is included in the latest 3GPP release. The sponsor (e.g., service provider) pays for the user's data usage in order to allow the user to access the service provider's services. This new model (sponsored data connectivity) enables additional revenue opportunities for both the service providers and the 3GPP network operators. In addition, 3GPP network 910 performs data flow based charging. In other words, different prices are applied based on QoS (data rates in this case), i.e., higher data rate flow incurs higher price than lower data rate flow does. 3GPP network 910 reports the dynamic changes of transmission data rate to service provider, so that service provider could adjust the service layer charging price applied to the service subscriber accordingly.

In this case, 3GPP network 910 should notify service provider when the service subscriber reaches the data volume threshold so that service provider is able to start charging the extra fee to the service subscriber. In addition, 3GPP network 910 needs to report changes of flow data rate for service subscriber to access the service. Unfortunately, there is no mechanism defined for service layer 904 to dynamically adjust the service layer charging behavior according to events occurred in the underlying network 910. In this case, service provider will not charge the service subscriber extra fee since it is not aware when the threshold is reached. Furthermore, service provider will always apply the same price to the service subscriber regarding to data rate in the underlying network, since it cannot get to know the change of the service data rate in the underlying network due to lack of dynamic charging report/configuration. Note that the Policy and Charging Enforcement Function (PCEF) 912 in 3GPP network 910 is the main entity to monitor these activities; it will contact the Policy and Charging Rules Function (PCRF) 914, which then reports to service layer entity.

Figure 10:
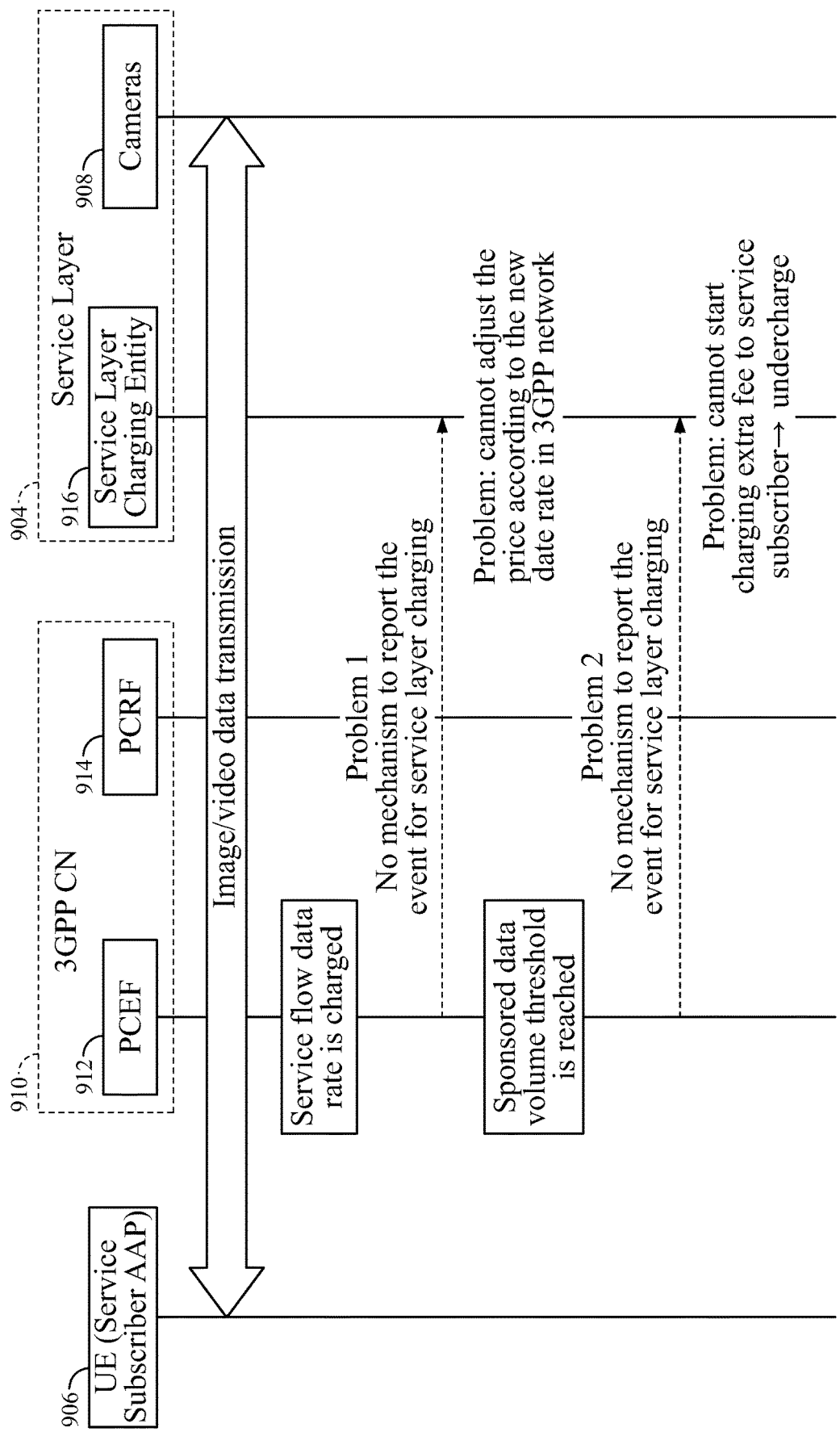
FIG. 10 is a flow diagram that shows problems with prior charging systems.

FIG. 10 is a flow diagram that shows problems with prior charging systems. In problem 1, after the flow data rate changes, there is no mechanism to report the event for service layer charging. In problem 2, after sponsored data volume threshold is reached, there is no mechanism to report the event for service layer charging.

The service provider charges the service subscriber based on the transactions related to service layer operations (e.g. sensor data reading, data retrieval); while underlying network 910 charges the service subscriber based on transport of data flow. The operations at the two layers are correlated, for example, the data retrieval operation at service layer would also involve the data transport at the underlying transport layer. Therefore it is necessary for service layer and underlying network to correlate the same charging related information.

More specifically, charging correlation is needed when service provider and underlying network operator are different business units. Even if they belong to the same business unit, there can be two charging systems, one for transporting data in underlying network 910, and the other for the service layer transactions. This is because a service could be provided through different underlying networks; while an underlying network 910 may transport data flow for different service layer platforms (i.e. service providers). For example, a service provider provides the cloud service and collects the service layer charging record regardless of the type of underlying network that is used to access the cloud infrastructure. In addition, the use case introduced below demonstrates that with charging related information from 3GPP network 910, service layer 904 could dynamically adjust the charging operations according to the charging policy change or some specific triggering events occurred in 3GPP network 910, so that service provider is able to achieve more accurate and efficient charging.

However, there is no general mechanism for the service layer 904 to request any charging correlation information from the underlying network entity and adjust service layer behavior based on the information that is obtained from the underlying network 910 (e.g. PCRF 914 in 3GPP network 910, Policy Enforcement Point (PEP) in Broadband Forum (BBF) fixed network) for performing charging at service layer 904. Moreover, existing service layers lack support for correlating charging information (i.e., charging correlation information defined later) at service layer. This lack of functionality may lead to someproblems.

Service layer charging is not accurate. Specifically, a service provider cannot dynamically adjust the service layer charging behavior (e.g. capture new chargeable event, apply new charging rate) corresponding to the charging policy change or triggering events occurred in the underlying network. In other words, service layer 904 does not support the mechanism of adjusting the charging behavior based on the notification from underlying network 910. This may lead to undercharge or overcharge to the service subscriber. For example, in the use case of FIG. 9, if service provider does not get the notification of reaching the data volume threshold from 3GPP network 910, it could not start charging extra fee to the service subscriber in addition to the monthly fee.

The prior systems increase the information exchange overhead for accurate service layer charging. Without the charging correlation mechanism at service layer 904, the service provider has to rely on underlying network charging system by passing service layer charging information down to the underlying network 910. This requires frequent communications between service layer 904 and underlying network to exchange service layer charging information, especially with M2M deployment there can be a huge number of devices and applications running on the service layer 904. Therefore, passing the service layer charging record to underlying network is not efficient. Specifically, service layer 904 needs to constantly pass the service layer CDRs to the underlying network. Underlying network 910 reconciles/ processes the service layer CDRs by considering correlated information in underlying network, and then passes these service layer CDRs to the billing system. This produces more message exchange overhead between underlying network and service layer 904, compared to the operations that underlying network only sends the charging related information to facilitate correlation performed at service layer.

Add extra complexity to underlying network 910. The underlying network 910 must be able to interpret service layer charging information that is passed to it. This requires underlying network having the ability of processing various types of charging information, especially there can be a huge number of devices and applications running in service layer 904. By having the service layer 904 performing charging and then passing the results down to the underlying network 910, the underlying network charging functionality does not need to be aware of things such as service layer charging policies, service layer charging information, format of service layer CDR, etc.

Current solutions mainly assume that the underlying network 910 (e.g. 3GPP network) dominates the charging operations (i.e., service layer 904 passes the charging related information to the underlying network, which is responsible for integrating/reconciling charging information for both service layer and the underlying network). Current service layer Standards Developing Organizations (SDOs) (e.g., oneM2M) did not define any mechanism to facilitate the service layer 904 charging by correlating the charging information from underlying network 910. There is no mechanism defined for service provider that could correlate the charging information from underlying network 910 (e.g. 3GPP network) for more accurate and efficient charging performed at service layer. Existing service layer charging solutions (e.g FIG. 6 and FIG. 7A-B) define some interactions between underlying network and service layer; however, there is no mechanism addressing the operation of correlating the charging information at service layer when getting certain charging information from underlying network.

The following discloses the service domain charging correlation as the operations of dynamically adjusting the service layer charging behavior based on the charging correlation information provided by the underlying network.

To support the dynamic charging operations, a Service Domain Charging Correlation Function (SD-CCF) 1102 can perform, but is not limited to some or all of, the following types of functionality: Managing the service layer charging correlation rules, interacting with underlying network, and performing the service layer charging correlation.

Managing (create, update and delete) the service layer charging correlation rules can facilitate the service layer charging correlation. Specifically, SD-CCF 1102 can receive the request for creating/updating/deleting a charging correlation rule from entities (e.g. charging service capability, application), and then performs the desired operations.

Interacting with underlying network can configure the charging correlation trigger in underlying network that may affect service layer charging operation. As defined later, a charging correlation trigger occurs at the underlying network 1106, and could reflect charging policy or charging information in the underlying network 1106. This function is achieved through message exchange between SD-CCF 1102 and underlying network entity. Specifically, SD-CCF 1102 can configure some triggers regarding charging policy and information in the underlying network. Upon receiving the occurrence notification from underlying network 1106, SD-CCF 1102 can perform a sequence of actions, such as configuring service layer charging policy, notifying other charging related entity (e.g. CTF and Charging SC) for updating the charging operations.

Performing the service layer charging correlation can update the service layer charging policy, and adjust the charging operation and service layer CDR. Specifically, SD-CCF follows a work flow by performing several actions as response to the received trigger from underlying network, e.g. if it needs to change service layer charging policy, if it needs to capture some new type of chargeable event, etc.

Figure 11:
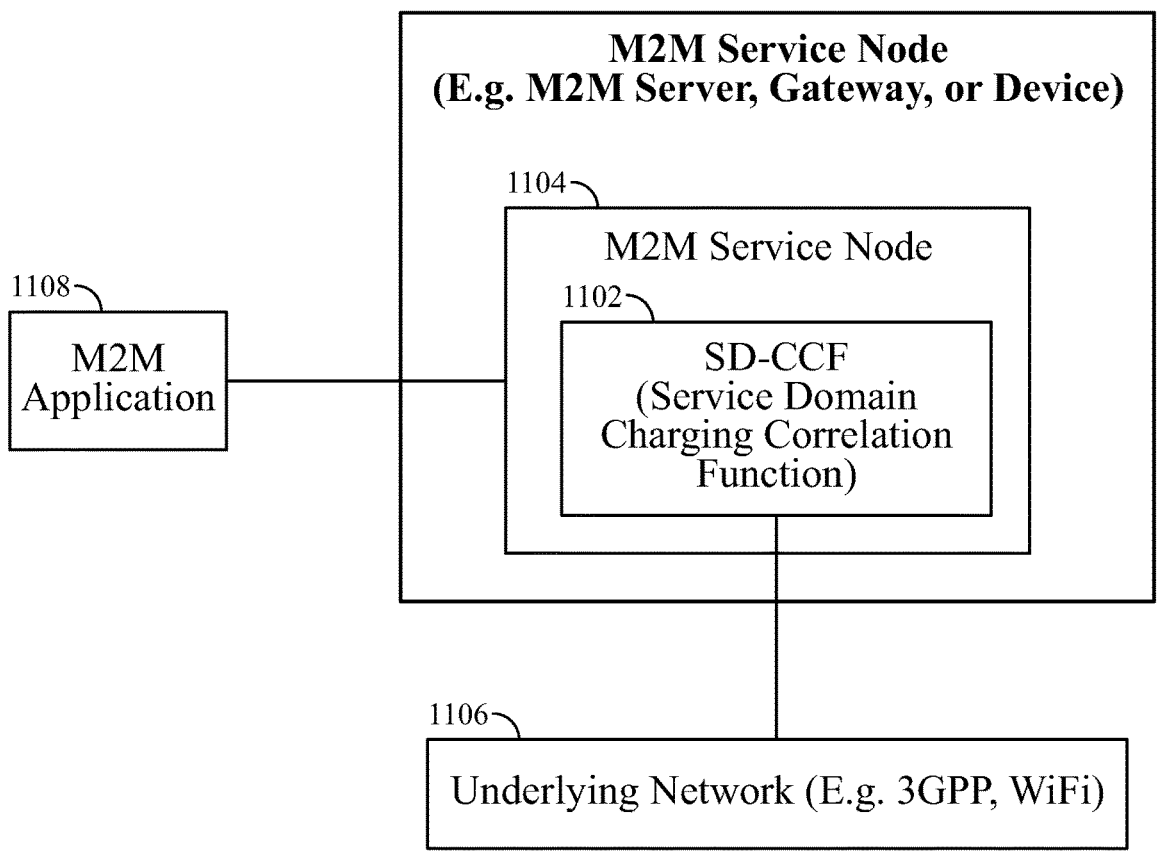
FIG. 11 is a diagram that illustrates a Service Domain Charging Correlation Function (SD-CCF) can be hosted within a M2M service layer instance.

As shown in FIG. 11, a Service Domain Charging Correlation Function (SD-CCF) 1102 can be hosted within a M2M service layer instance 1104, for example as an individual service capability within a M2M service layer instance 1104 as shown in FIG. 11. The SD-CCF 1102 could be a sub-function within an existing Charging SC as well.

Service Layer Charging Correlation is defined as the process of adjusting the service layer charging behavior according to charging correlation information provided by the underlying network. An example of charging correlation could be the following: the service subscriber runs out of credit in underlying network 1106 when retrieving the service data through service layer platform. Service provider gets the notification from underlying network 1106, and starts to charge extra fee from the service layer credit account of the service subscriber to maintain the same QoS of the data retrieval.

A Service Layer Charging Correlation Rule can define the rules for performing service layer charging correlation. Charging correlation rule can be service specific, and managed by the service provider in either pre-configured or dynamic way. The rule can include the following contents: Enablement indication, Correlation schedule, Network charging correlation triggering set, and Type of underlying network.

Enablement indication can indicate whether the charging correlation is enabled for a service, i.e. if it is allowed for correlating charging policy, charging information or both for a service. Note that the correlation rule should be service-specific, i.e. per rule per service. In other words, different services may have different charging correlation rules.

Correlation schedule can indicate how frequent the charging correlation is performed.

Network charging correlation triggering set can indicate the set of triggers from underlying network that may trigger the service layer charging correlation operation.

Type of underlying network can indicate what type of underlying network is expected to be involved in the charging correlation.

Network Charging Correlation Trigger can define the triggering event occurred in the underlying network that triggers the charging correlation operation at the service layer 1104. Charging correlation triggers could be then further classified into two types:

Charging Policy Trigger can imply that the charging policy change in the underlying network 1106 that may require service layer 1104 to change the service layer charging policy. The underlying network changes its charging policy for transporting the service data flow, service layer may also need to adjust the charging policy accordingly. This charging policy trigger could be, but not limited to, the following: QoS parameters change, Charging rate change, Charging measurement parameters change, Underlying network subscription change of the service subscriber, and Change of underlying network charging discount or bonus, QoS parameters change trigger can imply that the QoS parameter binding to an underlying network charging policy is changed for transporting the service data flow. As a result, the service layer 1104 needs to update the charging policy. For example, 3GPP network operator changes the guaranteed data rate from 10 Mbps to 5 Mbps with the same charging rate for transporting the service data flow. Under the sponsored data connectivity model, service provider pays for the 3GPP network data and charges the service subscribers, the service provider can either decrease the data rate binding to the service layer charging policy with the same charging rate, or apply a higher charging rate maintaining the original data rate.

Charging rate change trigger can imply that charging rate is changed in underlying network, which consequently affects the service layer charging rate.

Charging measurement parameters change trigger can imply that charging measurement method is changed for the service layer data flow in underlying network. For example, charging measurement is changed from data volume based charging to transaction based for sensor data retrieval service, since M2M application 1108 may deploy a very large number of devices, and requires small amount of data volume for each transaction.

Underlying network subscription change of the service subscriber trigger occurs when the service subscriber changes its monthly data plan in the underlying network, which may allow the user getting more bandwidth (e.g., higher data rate) for using the service at service layer.

Change of underlying network charging discount or bonus trigger can allow the service layer 1104 to change the service layer policy or to apply another policy for the service subscriber with discounted rate for delaying/scheduling its traffic such that it occurs during a specified time.

Charging Event Trigger can include events that trigger service layer to update the service layer charging information record (e.g. CDR) or update charging operations. For a service, with different events from underlying network, service layer may dynamically apply different charging policies and collect different chargeable events. For example, the trigger could be, but not limited to, the following: Reach sponsored data volume threshold, Service start/stop, Out of credit, Service data flow offload, and Availability of discount bandwidth in underlying network.

Reach sponsored data volume threshold trigger can indicate the service subscriber reaches the data volume threshold of sponsored data link in underlying network, which usually incurs extra charge to the service subscriber for future data transport.

Service start/stop trigger can indicate that the service data flow starts/stops to be transported through a specific underlying network.

Out of credit trigger can indicate that the user's credit in underlying network may not be enough for continuing using the service with current QoS. This may trigger the service layer 1) stops providing service or degrades the QoS level; 2) maintains the same QoS by charging user more at service layer. In other words, option 1 applies a new charging policy with different QoS parameters; while option 2 applies a new charging policy with higher charging rate. As an example, this information could be expressed and exchanged through Specific-Action Attribute Value Pair (AVP) and Final-Unit-Action AVP defined by 3GPP.

For the service data flow offload trigger, the underlying network 1106 indicates that it offloads the service data flow for a service to another underlying network, so that the service layer 1104 could adjust the charging operations for the new underlying network. There are multiple reasons that may trigger the offload, for example, congestion in the original underlying network, and better transmission quality due to the mobility.

The availability of discount bandwidth in underlying network trigger may allow the service subscriber to receive higher quality of service at service layer while being charged with the discount. Service layer could adjust the policy applied to the service subscriber under this scenario.

A rule can be equivalent to a policy, and a trigger can be a special type of event, which may require additional operations upon the occurrence of the event. To avoid the confusion, the term "charging correlation rule" is used to differentiate with traditional concept of "charging policy"; the term "charging correlation trigger" is applied to differentiate with the concept of "chargeable event".

Figure 12:
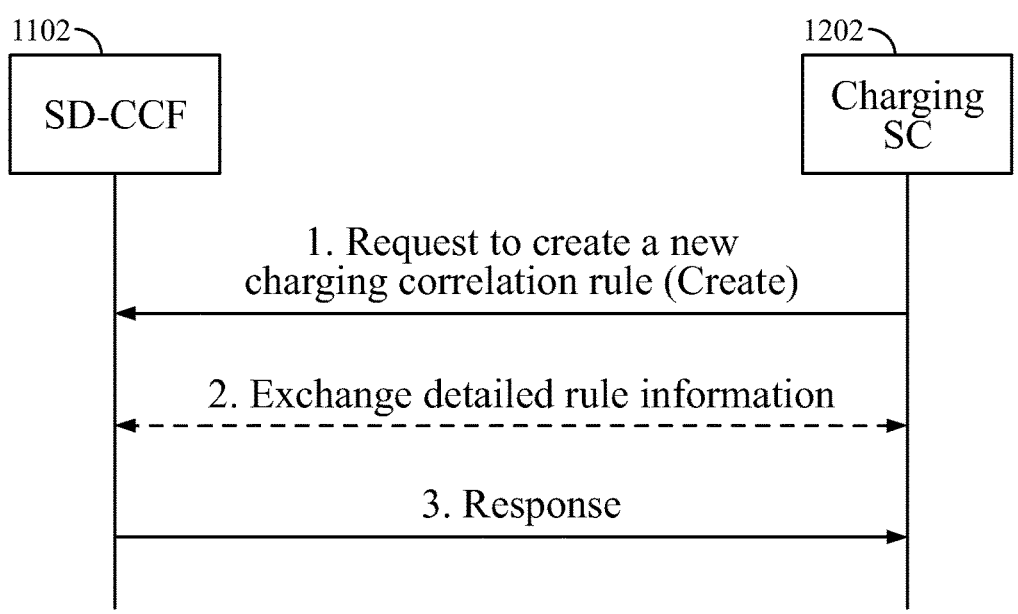
FIG. 12 is a flow diagram that illustrates a procedure for creating a new charging correlation rule in one embodiment.

The SD-CCF 1102 can be responsible for creating, updating and deleting the charging correlation rule for services. A charging correlation rule can be pre-configured or dynamically updated for a service through communication between SD-CCF 1102 and service layer charging entity. FIG. 12 is a flow diagram that illustrates a procedure for creating a new charging correlation rule in one embodiment.

Step 1 of FIG. 12 shows that the Charging Service Capability 1202 first issues a request (CREATE) to SD-CCF 1102 to create a new charging correlation rule. There are several events that may trigger the request issued by the charging SC 1202, for example.

A new service is added to the service platform, the service provider wants to create a charging correlation rule for the new service.

A new version of an existing service is provided with a new functionality, which requires more charging correlation operation with underlying network. In this case, service provider wants to create a new rule instead of updating existing rules, since the existing rule will be applied for the old version.

The underlying network 1106 shares its charging capability information with service layer 1104, e.g. what events or triggers underlying network is able/allowed to send to service layer. Based on this information, service layer could create/update the charging correlation rule accordingly.

In the request message, the Charging SC 1202 will specify the details about the new rule, such as what type(s) of underlying network 1106 is supposed to interact for correlation, what triggers are enabled for the charging correlation, and the service for which the new rule is created. SD-CCF 1102 will create a charging correlation rule on the request. An exemplary non-limiting charging correlation rule is shown in Table 2 referring to the home surveillance service.

TABLE 2

An Example of Charging Correlation Rule for Home Surveillance Service

| Rule Attribute | Value | Description |
| --- | --- | --- |
| Service ID (type) | Home Surveillance Service | Identify the service for which this rule is created for |
| Enablement for charging policy trigger | Disabled | Indicate that the charging correlation is NOT enabled/allowed for this service from the charging policy perspective. |
| Enablement for charging event trigger | Enabled | Indicate the correlation regarding the charging event trigger is enabled/allowed for this service |
| Charging event trigger1 ID (type) | Reach data volume threshold | Indicate the event trigger of reaching the data volume threshold |
| Charging event trigger2 ID (type) | Transport data rate change | Indicate the event trigger of data rate change in the underlying transport layer |

Charging SC 1202 refers to the entity which is responsible for charging at service layer, e.g. SD-CS 610 of FIG. 6. Furthermore, the requestor does not have to be a Service Capability entity. It can be any entity that defines charging correlation rule, even an underlying network entity. For example, it can be an application, where the application defines a service.

Step 2 of FIG. 12 is an optional step in case that SD-CCF 1102 contacts Charging SC 1202 for more details or missing information in the request for creating the new correlation rule.

In Step 3 of FIG. 12, after creating the new rule, SD-CCF 1102 returns a reachable address or interface to Charging SC 1202, so that charging SC 1202 could access the charging correlation rule in the future.

The charging correlation trigger from underlying network 1106 may also require SD-CCF 1102 creating a new service layer charging policy, which will be discussed next section.

A similar procedure could be applied to update or delete an existing charging correlation rule by replacing CREATE in the request.

The following defines some exemplary message exchange procedures between service layer and underlying network for charging correlation. The SD-CCF 1102 is shown as part of Charging SC 1202 for illustration in this subsection. Alternately, the SD-CCF 1102 could be a standalone function or added as part of another SC in the service layer.

It is understood that the entities performing the steps illustrated in FIG. 12 are logical entities that may be implemented in the form of software (i.e., computer-executable instructions) stored in a memory of, and executing on a processor of, a device, server, or other computer system such as one of those illustrated in FIG. 22C or 22D. That is, the method(s) illustrated in FIG. 12 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 12. It is also understood that any transmitting and receiving steps illustrated in FIG. 12 may be performed by communication circuitry of the node under control of the processor of the node and the computer-executable instructions (e.g., software) that it executes.

Figure 13:
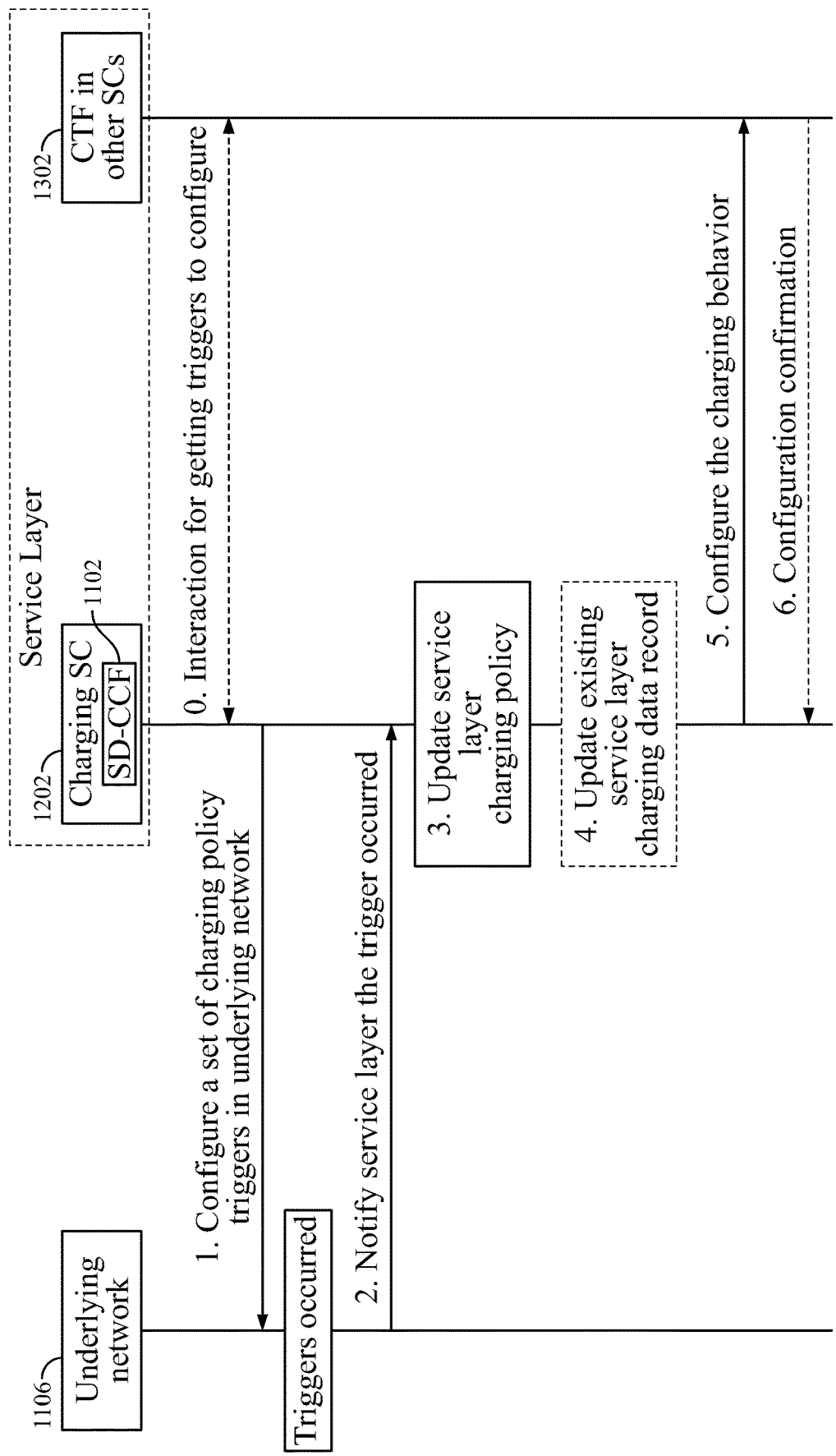
FIG. 13 is a flow diagram that illustrates a procedure of message exchange for charging policy correlation of one embodiment.

FIG. 13 is a flow diagram that illustrates a procedure of message exchange for charging policy correlation of one embodiment.

In Step 0 of FIG. 13, before configuring the charging policy trigger in the underlying network, SD-CCF 1102 can interact with CTFs 1302 to get the charging policy trigger that may be configured in the underlying network 1106. These triggers would affect the service layer charging behavior.

This could be done in an on-demand manner. Specifically, a CTF 1302 checks those desired chargeable events and the information included in these events, and determines if there is any such trigger. If there is any piece of information that may be affected by the charging policy update, the CTF 1302 will contact SD-CCF 1102 to specify the charging policy trigger that is required for charging correlation. In the message, the following information may be included: Service information, charging policy ID and chargeable event ID, and charging attributes information.

For service information, the SD-CCF 1102 can understand the charging correlation trigger works for what service.

For the charging policy ID and chargeable event ID, SD-CCF 1102 can use this information to retrieve the more detailed charging policy and chargeable event information to figure out what charging correlation trigger is required to configure.

For the charging attributes information, e.g. data rate or charging measurement method, SD-CCF 1102 can figure out the type of trigger to configure through this information.

As a result, SD-CCF 1102 does not have to contact all the CTFs one by one; it configures a charging policy trigger only when a CTF initiates the interaction with the specified charging policy trigger.

In Step 1 of FIG. 13, SD-CCF 1102 configures some charging policy triggers in the underlying network. These triggers occurring in underlying network may affect the service layer charging policy. In the configuration message, SD-CCF 1102 can specify the list of policy triggers. Service layer maintains the configuration information per service per trigger, i.e. service layer records which service needs which trigger.

The message sent to underlying network 1106 contains only trigger information since the underlying network may not be aware of what a service is. In addition, service layer 1104 may also configure the trigger for an individual or a group of service subscribers. In other words, underlying network notifies the service layer 1104 only when the configured trigger takes place for the specific users. This reduces the communication overhead between service layer 1104 and underlying network 1106.

SD-CCF 1102 may aggregate multiple configurations regarding different policy triggers, each of which corresponds to different services.

There may be multiple services configuring the same trigger. As an example, SD-CCF 1102 can create and maintain a charging correlation rule for home surveillance service. This rule can indicate if the charging correlation is enabled for the service, what set of triggers are configured for this service, what charging policy and chargeable event will be affected by a trigger. Note that the trigger/charging policy/chargeable event could be identified by their ID.

As an example, service layer 1104 could know the address of underlying network entities via pre-provisioning.

In Step 2 of FIG. 13, once the underlying network entity (e.g. PCRF/PCEF in 3GPP network, Policy Enforcement Point (PEP) in BBF fixed network) detects the occurrence of the subscribed trigger, it sends the notification to SD-CCF 1102 indicating what trigger occurs. In addition, the underlying network should specify the necessary parameters that are changed. For example, the new sponsored data volume threshold, the new data rates binding to the existing charging policy. These parameters are required for service layer 1104 to create/update the service layer charging policy correspondingly.

In Step 3 of FIG. 13, upon receiving the notification from underlying network, SD-CCF 1102 may check what service (s) configure the charging policy trigger (e.g. compare the trigger ID and service ID with the maintained information of what service configures what trigger), because there could be multiple services configuring the same trigger. Verify if the reported trigger is enabled for a certain service. And, check the information about what charging policy and chargeable event will be affected by the reported trigger.

Then SD-CCF 1102 updates the charging policy based on the parameters included in the notification. Specifically, SD-CCF 1102 can do one of the following actions: Create a new charging policy or Update attribute(s) in an existing charging policy.

Create a new charging policy implies that the underlying network 1106 changes its charging policy, while service layer has no existing charging policy corresponding to that change. For example, underlying network 1106 changes to charging measurement for the air quality sensor data reading from volume based to transaction based, service layer 1104 needs to establish a transaction based charging policy for the sensor data reading service and maintain the previous data volume based policy which may be used by other types of underlying network 1106.

Update attribute(s) in an existing charging policy implies that charging policy change in underlying network 1106 affects the existing service layer charging policy, and service layer 1104 needs to change some attributes in the policy, for example, the sponsored data volume threshold, charging rate.

Step 4 of FIG. 13 is an optional step 1102 that SD-CCF may need to update the existing service layer CDR when receiving certain types of triggers from underlying network. For example, the underlying network increase the charging rate for service data flow, SD-CCF 1102 can update the charging rate at service layer Charging Data Recorder (CDR). Another example, underlying network 1106 decides to apply a discounted rate to all data during a period of time, therefore service provider could apply lower service layer charging price as well in that period.

Note that CDR could be maintained in a database, where SD-CCF 1102, CTF and Charging SC 1202 could access and process the CDR for different reasons. SD-CCF 1102 updates the CDR due to the correlation operations; CTF updates CDR because it captures some new chargeable events; Charging SC 1202 updates/processes CDR because it may be required to pass CDR files to billing system.

In Step 5 of FIG. 13 the SD-CCF 1102 informs the Charging Triggering Function (CTF) 1302 in other service capability to change the charging behavior according to the new charging policy. In the notification, SD-CCF 1102 indicates the chargeable events specified by event ID the CTF 1302 needs to collect.

Then CTF 1302 looks up the event ID to understand what information is supposed to include for the chargeable event. For example, underlying network changes the charging measurement method from transaction based to data volume based for the data retrieval service, therefore SD-CCF 1102 notifies CTF 1302 in session management SC to start collecting the data volume of the service data flow for the data retrieval service.

Note that SD-CCF 1102 could know the existence of those CTFs 1302 during the registration procedure. For example, in oneM2M, there are <CSEbase>, <remoteCSE> and <AE> resources, SD-CCF could know which CTF 1302 to contact by checking these resources.

Step 6 of FIG. 13 is an optional step. CTF 1302 may send a confirmation to the SD-CCF 1102 for confirming the change of charging behavior.

Note that besides fully replying on underlying network 1106, the client (e.g. application) itself could also receive some automatic messages (e.g. data usage reminders) from the underlying network. Accordingly, the client can actively report such information to SD-CCF 1102 to perform correlation. In this case, the underlying network will notify the client first, and then client notifies the SD-CCF 1102 with the charging policy trigger. Charging event trigger has the similar case with this scenario.

It is understood that the entities performing the steps illustrated in FIG. 13 are logical entities that may be implemented in the form of software (i.e., computer-executable instructions) stored in a memory of, and executing on a processor of, a device, server, or other computer system such as one of those illustrated in FIG. 22C or 22D. That is, the method(s) illustrated in FIG. 13 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

Figure 14:
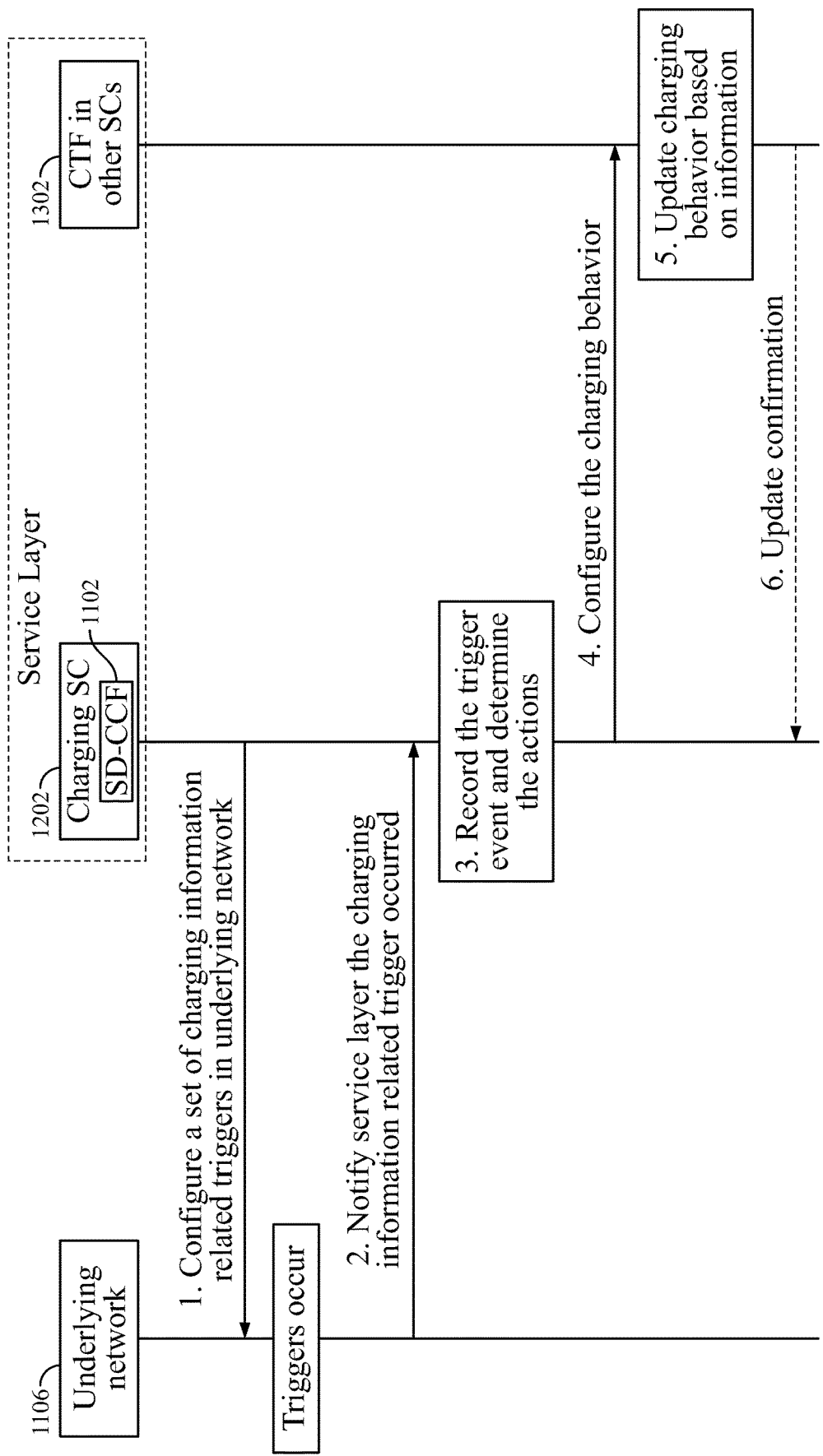
FIG. 14 is a flow diagram that illustrates a procedure of message exchange to facilitate the charging information correlation.

FIG. 14 is a flow diagram that illustrates a procedure of message exchange to facilitate the charging information correlation.

In Step 1 of FIG. 14, SD-CCF 1102 first configures some charging event triggers in the underlying network. Similar to the charging policy trigger, these triggers imply some events that may affect the service layer charging behavior. Similar to the charging policy correlation scenario, CTF 1302 contacts SD-CCF 1102 regarding the desired charging correlation triggers in on-demand manner, so that SD-CCF 1102 could configure the trigger in the underlying network. More details are discussed in description of step 0 shown FIG. 13.

Step 2 of FIG. 14 is similar to step 2 of FIG. 13.

In Step 3 of FIG. 14, SD-CCF 1102 records the charging information triggers and determines further actions (e.g. apply new charging rate for a service, start collecting data volume information) based on the type of trigger and the service configuring the trigger. SD-CCF 1102 could also verify if the reported trigger is enabled for a certain service and check the information about what charging policy and chargeable event will be affected by the reported trigger.

In Step 4 of FIG. 14, SD-CCF 1102 notifies the CTF 1302 in other SC about the new charging actions determined based on the triggers. SD-CCF 1102 could know the existence of those CTFs 1302 by checking the results of the registration procedure. For example, SD-CCF 1102 notifies CTF 1302 in session management SC to start collecting the data volume for a service subscriber who subscribes to the Home Surveillance service and reaches the data volume threshold.

In Step 5 of FIG. 14, upon receiving the configuration from SD-CCF 1102, charging trigger function (CTF) 1302 updates the list of chargeable event per service. Specifically, CTF 1302 maintains some information about what chargeable event is desired to collect for what service, and what information should be included for each chargeable event. If some new types of chargeable event are required to collect, CTF 1302 could check the event information according to the event ID, which identifies an event, and add the new event to the list.

In Step 6 of FIG. 14, as an optional step, CTF 1302 may send a confirmation to the SD-CCF 1102 for confirming the change of charging behavior.

In some cases, the underlying network 1106 may also initiate the charging correlation procedure by communicating with the service layer 1104. For example, the underlying network 1106 (e.g. 3GPP network) decides to offload the service data flow to another type of underlying network 1106 (e.g. WiFi) for some reason (e.g. network congestion, better communication quality). In this case, underlying network 1106 will directly report the occurrence of the trigger to SD-CCF without configuration step (i.e., step 1 in FIG. 14.)

It is understood that the entities performing the steps illustrated in FIG. 14 are logical entities that may be implemented in the form of software (i.e., computer-executable instructions) stored in a memory of, and executing on a processor of, a node device, server, or other computer system such as one of those illustrated in FIG. 22C or 22D. That is, the method(s) illustrated in FIG. 14 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 14. It is also understood that any transmitting and receiving steps illustrated in FIG. 14 may be performed by communication circuitry of the node under control of the processor of the node and the computer-executable instructions (e.g., software) that it executes.

Figure 15:
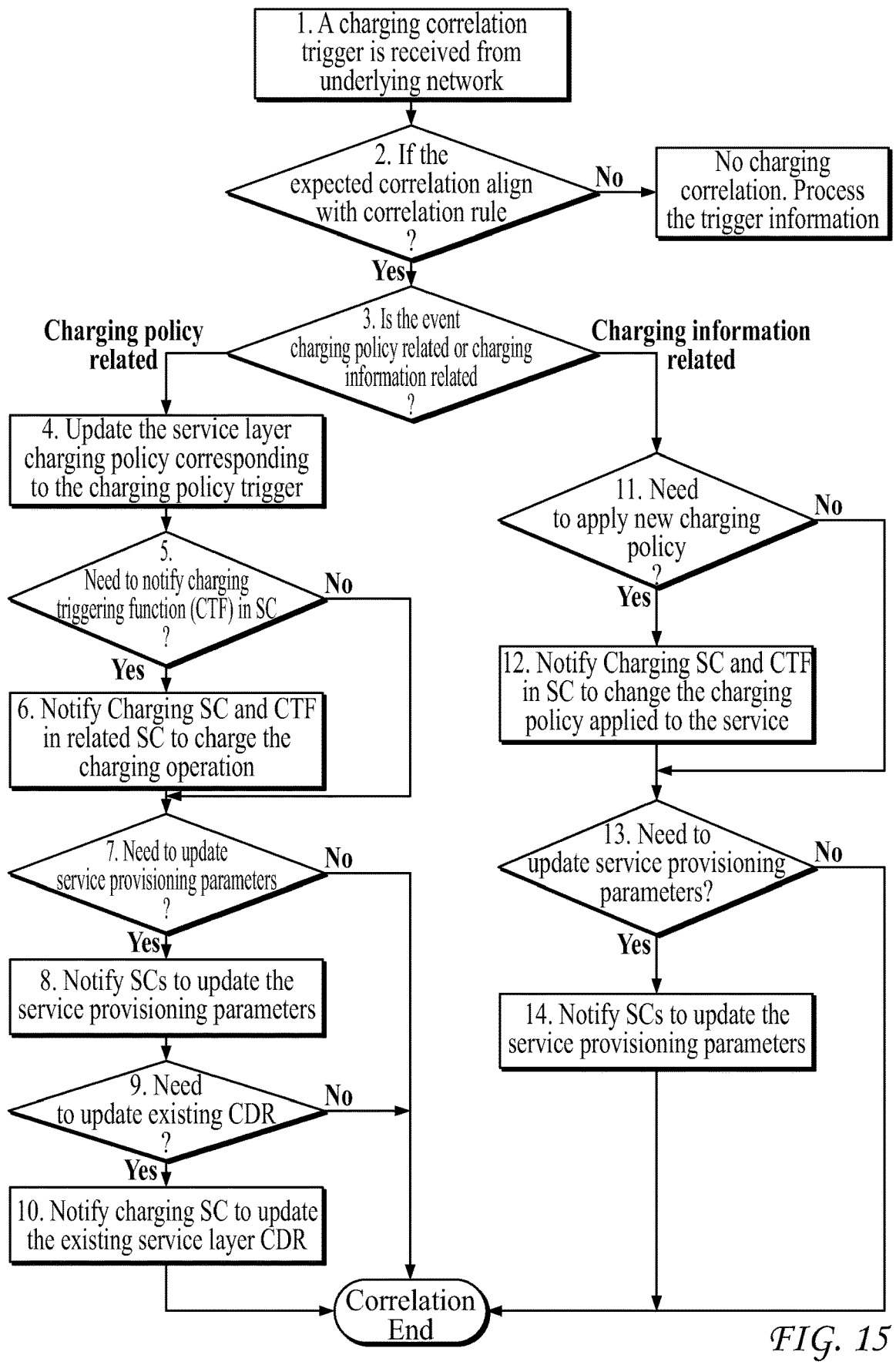
FIG. 15 is a flow diagram that illustrates an exemplary method for performing the service layer charging correlation.

FIG. 15 is a flow diagram that illustrates an exemplary method for performing the service layer charging correlation. The correlation operation could be applied to both charging policy trigger and charging event trigger that are captured by the underlying network.

In step 1 of FIG. 15, the charging correlation method is triggered when SD-CCF 1102 receives a notification indicating the occurrence of the configured trigger in the underlying network 1106. The notification specifies the trigger ID, and the underlying network ID which generates the notification. SD-CCF 1102 could use the trigger ID to retrieve the correlation trigger information, such as trigger is policy related or charging information related, what event takes place in the underlying network.

In step 2 of FIG. 15, SD-CCF 1102 checks charging correlation rule to determine if the charging correlation is enabled/allowed regarding the reported trigger, i.e., if the reported trigger is configured by the SD-CCF 1102 before. Since the underlying network may initiate the trigger report in some cases, service layer needs to verify if the reported trigger is enabled for which service.

The SD-CCF 1102 also verifies which services configured the reported trigger, since underlying network may not specify the service information, and multiple services may configure the same trigger.

Specifically, SD-CCF 1102 needs to find out a couple of things, such as what service(s) subscribe to the trigger, if charging correlation operation is enabled by the service. If the check returns NO, there is no charging correlation operation performed. This step could be done through checking the information created and maintained by SD-CCF 1102. For example, SD-CCF 1102 will maintain the information about what trigger it is configured at underlying network for which service(s), if a correlation trigger is enabled or allowed for a service. Embodiment section will specify the structure of these information regarding the correlation rule and triggers for oneM2M.

In step 3 of FIG. 15, based on the actions in step 2 of FIG. 15, if the charging correlation and the reported trigger are enabled for the service, SD-CCF 1102 continues to check if the trigger is related to charging policy or charging information, so that different operations are performed for the 2 types of triggers.

If it is not allowed to perform charging correlation, SD-CCF 1102 checks the trigger information, and let service provider determine if adding the reported trigger to the correlation rule for the service. If the trigger is not understandable, SD-CCF 1102 will require the information of the reported trigger.

Steps 4 to step 10 of FIG. 15 are performed for charging policy trigger.

In step 4 of FIG. 15, in case that the trigger is related to charging policy, SD-CCF 1102 first updates the service layer charging policy corresponding to the trigger from underlying network. Specifically, SD-CCF 1102 may create a new charging policy or update attribute(s) in an existing charging policy In step 5 of FIG. 15, the SD-CCF 1102 further checks if there is a need to notify CTF 1302 in other SC regarding the updated charging policy, so that CTF 1302 could adjust the way to collect the chargeable event. For example, charging policy change from transaction based to data volume based requires that the CTF 1302 inserts the data volume information in the collected charging record and possibly collects some new chargeable events which are not needed for transaction based charging.

In some cases, it is not required to communicate with CTF 1302 since the charging policy change only affects the CDR processing. For example, changing charging rate will not require CTF to change any behavior to collect the chargeable event and the information in the collected charging record.

To make this decision, SD-CCF 1102 could check the information maintained at service layer to find out if it is necessary to contact CTF 1302 and which CTF 1302 needs to be notified at which entity if necessary. For example, such information could be, not limited to, the following:

<CSEBase>, <remoteCSE> and <AE> resources defined in oneM2M to indicate what functionality (e.g. session management) contains CTF 1302.

Resource <statsCollect> defined in oneM2M to contain the service layer charging policy for a service. If the charging policy is affected, i.e. reported trigger changes some attributes in the charging policy resource, it is required to notify CTF 1302.

Resource <eventConfig> defined in oneM2M to contain the service layer chargeable event for a service. Similar to the charging policy, SD-CCF 1102 looks over this resource to determine if it is required to notify CTF 1302 based on received trigger from underlying network.

In step 6 of FIG. 15, the SD-CCF 1102 notifies the Charging SC 1202 and CTF 1302 in related SC about the change of charging policy and expected chargeable event. The message includes the new charging policy, the expected chargeable event, service ID. Charging SC 1202 and CTF 1302 could use the information to adjust the way to collect the chargeable event and the information collected for the chargeable event.

In step 7 of FIG. 15, SD-CCF 1102 makes a check whether it needs to notify certain SC to change the service provisioning parameters. For example, maximum data rate binding to an underlying network charging policy is changed for data retrieval service; SD-CCF 1102 needs to notify the session management SC to adjust the maximum data rate accordingly.

In step 8 of FIG. 15, SD-CCF 1102 notifies the related SC about the change of service provisioning parameters. Specifically, SD-CCF 1102 indicates the parameters to be changed and the new values.

In step 9 of FIG. 15, SD-CCF 1102 further checks if it is necessary to re-process the existing CDR for the service whose charging policy is updated. For example, underlying network applies the transaction based charging for service data flow for the sensor data reading service, which was data volume based before, so that service layer needs to remove the data volume value from the existing CDR.

In step 10 of FIG. 15, SD-CCF 1102 notifies the Charging SC 1202 to update the existing service layer CDR. The notification includes the specific guidance on how to update the CDR (e.g. removing the data volume information, updating the charging rate). In one embodiment, how to update the CDR is responsibility of Charging SC 1202, not performed by SD-CCF 1102.

Step 11 to step 14 of FIG. 15 are performed for charging event trigger.

In step 11 of FIG. 15, once receiving charging event trigger, SD-CCF 1102 determines if it is necessary to apply another charging policy corresponding to the trigger occurred in the underlying network. Note that the charging information trigger will not require any update of service layer charging policy, but may require applying another policy for the service. For example, the trigger that data volume threshold is reached requires service layer start charging extra fee to the service subscriber for future data volume.

Step 12 of FIG. 15 is similar to step 6 of FIG. 15. The SD-CCF 1102 notifies Charging SC 1202 and CTF 1302 in related SC about the change of applied charging policy.

Steps 13-14 of FIG. 15 are similar to steps 7 and step 8 of FIG. 15. The SD-CCF 1102 makes a check whether it needs to notify certain SC to change the service provisioning parameters and notifies the related SC about the change of service provisioning parameters if necessary.

Note that it is also possible that service layer 1104 provides some information to underlying network 1106, so that underlying network 1106 could adjust the charging behavior per user or per service. For example, a service subscriber upgrades its service layer subscription to premium account, which gives the service subscriber unlimited free data in 3GPP network to access the service. Service layer 1104 needs to notify 3GPP network, which will not count the data volume of the service for that user into its 3GPP network monthly data plan.

It is understood that the entities performing the steps illustrated in FIG. 15 are logical entities that may be implemented in the form of software (i.e., computer-executable instructions) stored in a memory of, and executing on a processor of, a node, device, server, or other computer system such as one of those illustrated in FIG. 22C or 22D. That is, the method(s) illustrated in FIG. 15 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

Figure 16:
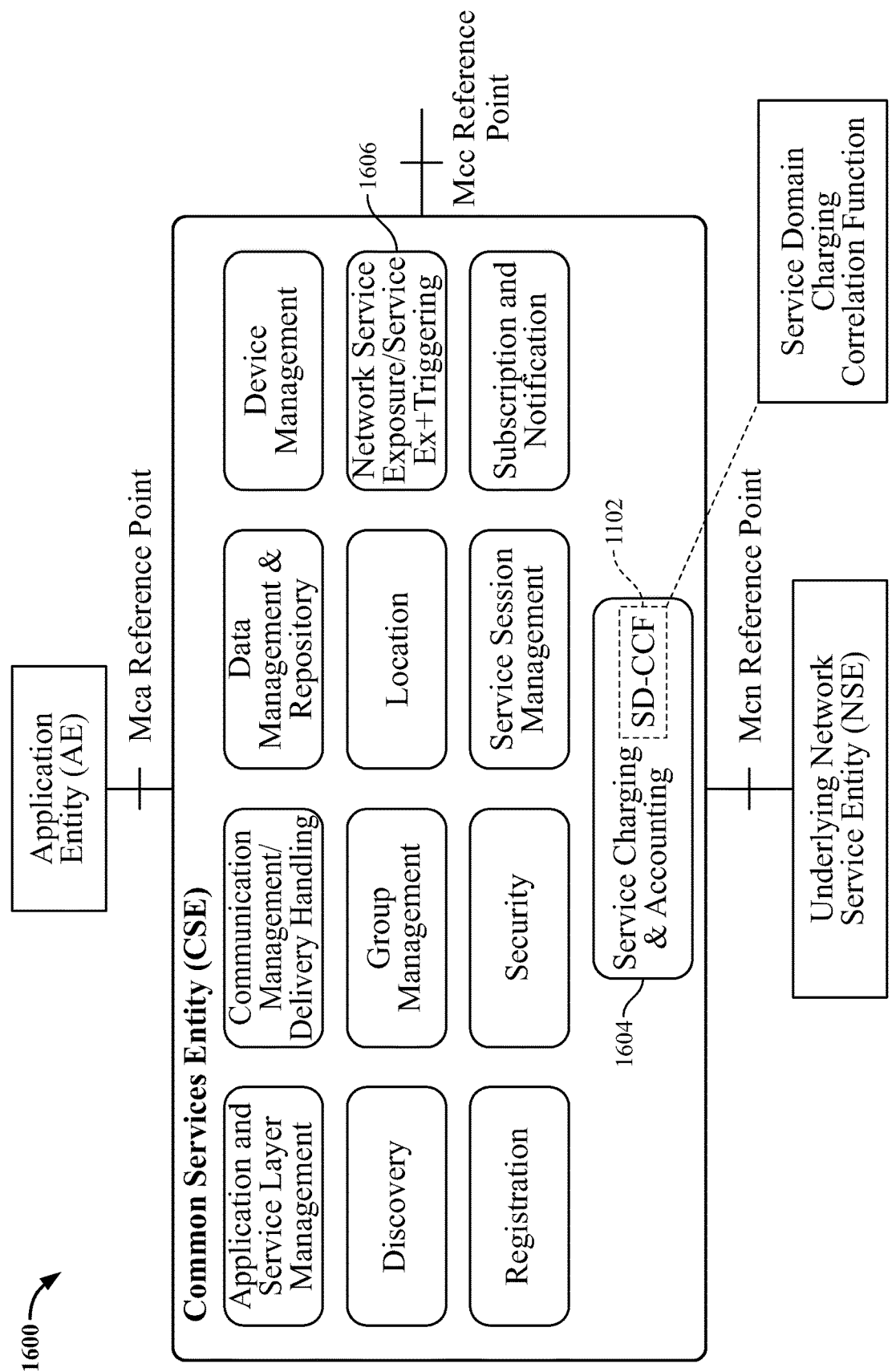
FIG. 16 is a diagram that illustrates one exemplary embodiment for implementing the proposed SD-CCF as a part of Service Charging & Accounting (SCA) CSF based on a oneM2M functional architecture.

FIG. 16 is a diagram that illustrates one exemplary embodiment for implementing the proposed SD-CCF 1102 as a part of Service Charging & Accounting (SCA) CSF 1604 based on a oneM2M functional architecture 1600. Note that the proposed SD-CCF could also be added as a sub-function of Network Service Exposure, Service Execution and Triggering (NSSE) CSF 1606, which is mainly responsible for managing communications with the Underlying Networks for accessing network service functions over the Mcn reference point.

This section discloses oneM2M resource structure enhancements for supporting charging correlation functionality for the SCA CSF 1604.

Note that the oneM2M defined graphical representation for describing resource structures is the following: Square boxes are used for resources and child resources. Square boxes with round corners are used for attributes.

Figure 17:
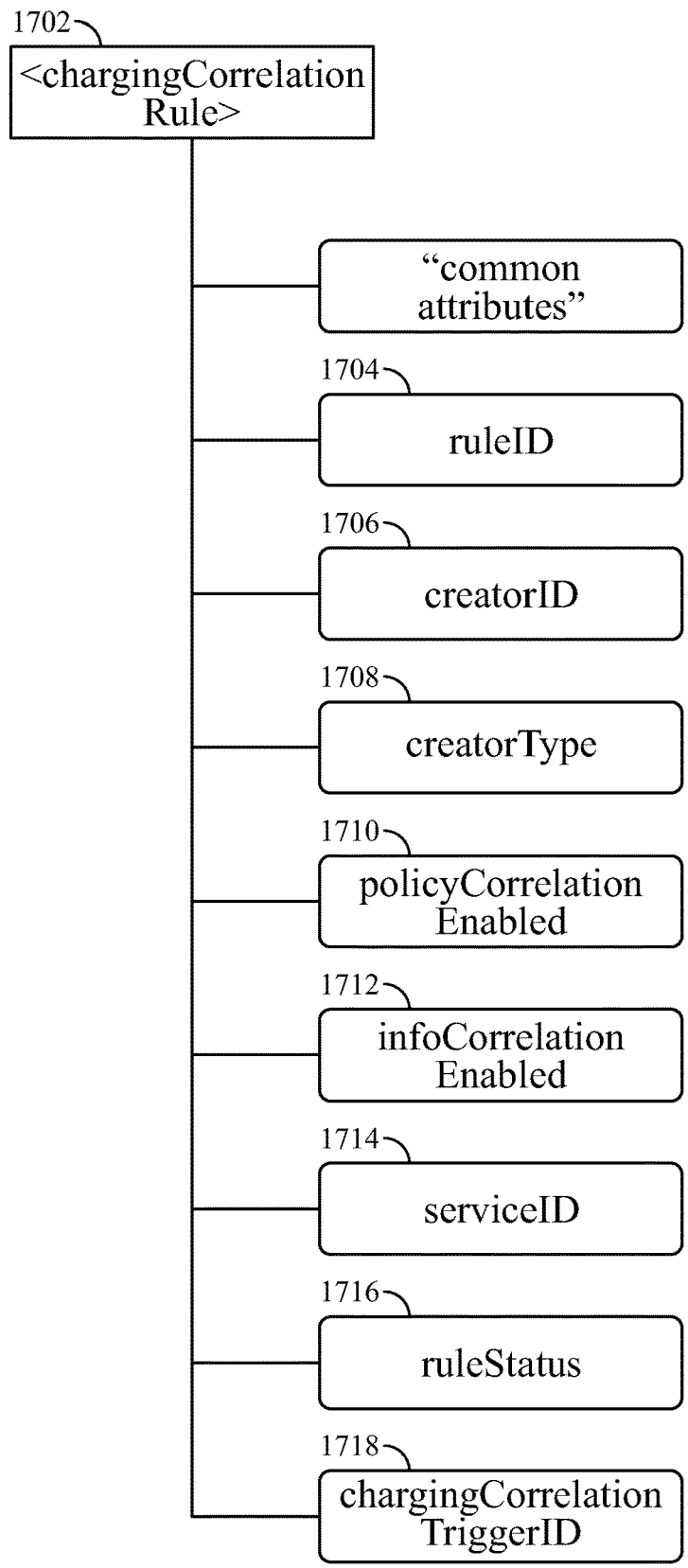
FIG. 17 is a diagram that illustrates a <chargingCorrelationRule> resource.

FIG. 17 is a diagram that illustrates a <chargingCorrelationRule> resource 1702 that reflects the service layer charging correlation rule, which is described in Table 3. There could be multiple charging correlation rules for different services, i.e. the charging correlation rule is service specific identified by the rule ID 1704 and service ID 1714 attributes. The proposed <chargingCorrelationRule> resource 1702 could be added as a sub-resource of <CSEBase>, <remoteCSE> and <AE> resource.

TABLE 3

Attributes for <chargingCorrelationRule> Resource

| Attribute/child resource | Description |
| --- | --- |
| ruleID 1704 | This is the unique ID of the charging correlation rule. It is created when the charging correlation rule resource is first created. |
| creatorID 1706 | This is the unique ID of the entity that created the charging correlation rule. For example, it can be an application (AE) ID or a CSE ID. |
| creatorType 1708 | This is the type of the creator, such as "application", "CSE". |
| policyCorrelationEnabled 1710 | Indicates whether charging policy correlation is enabled for this service ID |
| infoCorrelationEnabled 1712 | Indicates whether charging information related correlation is enabled for this service ID |
| serviceID 1714 | Identifier of the service for which this charging correlation rule is created. The charging correlation rule is service specific. |
| ruleStatus 1716 | This attribute indicates whether the rule is "active" or "inactive", or "information recording only" which means no charging correlation is performed. |
| chargingCorrelationTriggerID 1720 | This attribute contains a list of trigger IDs that are enabled by this charging correlation rule for the service. |

Figure 18:
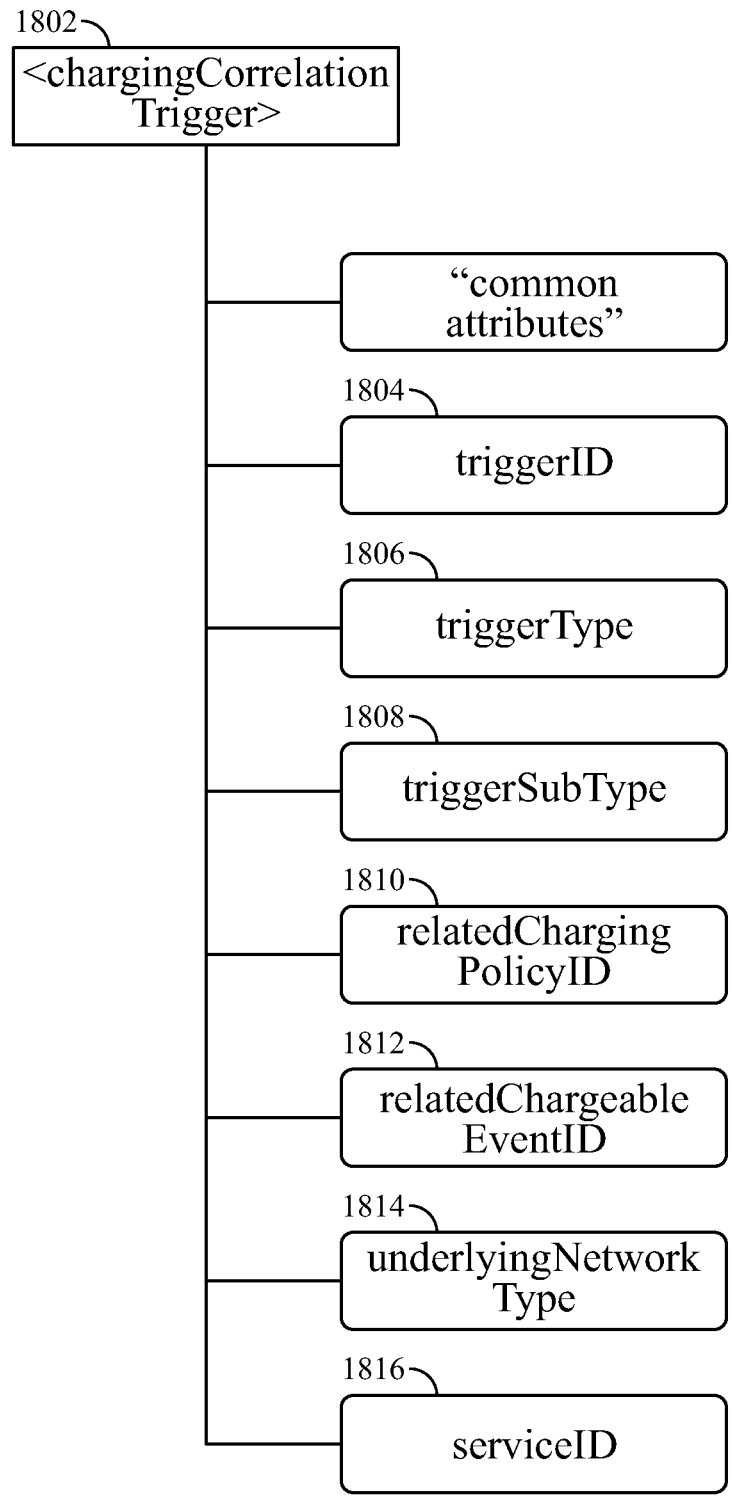
FIG. 18 is a diagram that illustrates a <chargingCorrelationTrigger> resource.

FIG. 18 is a diagram that illustrates a <chargingCorrelationTrigger> resource 1802 that reflects the service layer charging correlation rule for the services, which are described in Table 4.

TABLE 4

Attributes for <chargingCorrelationTrigger> Resource

| Attribute | Description |
| --- | --- |
| triggerID 1804 | This is the unique ID of the charging correlation trigger. |
| triggerType 1806 | This attribute indicates if the trigger is related to charging policy or charging information. |
| triggerSubType 1808 | This attribute indicates specific type of trigger, e.g. reach data volume threshold, data rate change. |
| relatedChargingPolicyID 1810 | This indicates a list of service layer charging policy that may be affected by the trigger. |
| relatedChargeableEventID 1812 | This indicates a list of service layer chargeable events that may be affected by the trigger. The chargeable event information is maintained by the <eventConfig> resource. |
| underlyingNetworkType 1814 | This indicates the type of underlying network at which the trigger can be configured |
| serviceID 1816 | This attribute includes a list of service IDs, the charging operation may be affected for each service by this trigger |

For presenting more details about how the SD-CCF 1102 works with underlying network 1106 for charging correlation, 3GPP network is used as an example for illustration.

Figure 19:
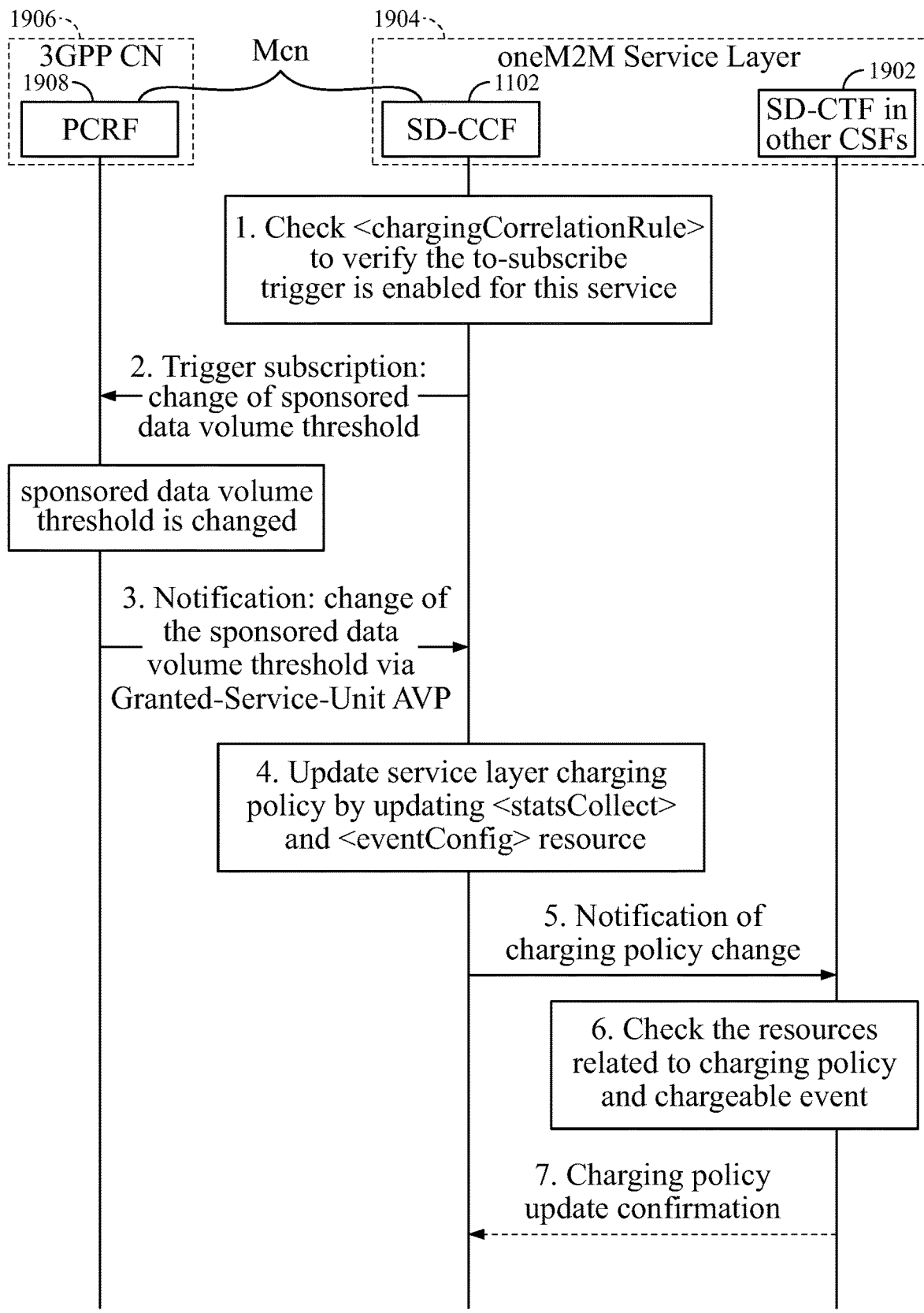
FIG. 19 is a diagram that illustrates an exemplary embodiment of the oneM2M charging policy correlation with 3GPP network.

FIG. 19 is a diagram that illustrates an exemplary embodiment of the oneM2M charging policy correlation with 3GPP network that demonstrates how the proposed oneM2M SD- CCF 1102 works to correlate the charging policy change in 3GPP network. In this case, the sponsored data volume threshold is changed in 3GPP network, which informs the oneM2M service layer. Consequently, oneM2M service layer platform updates the service layer charging policy and notifies the SD-CTF 1902 to apply the new charging policy.

In step 1 of FIG. 19, the SD-CCF 1102 checks <chargingCorrelationRule> resource to make sure that the charging policy trigger of sponsored data volume threshold change is enabled for the service. This step may be triggered by receiving some charging policy triggers from CTF. Specifically, a SD-CTF 1902 may find a charging policy trigger by checking the chargeable event to be collected and the information therein, and then send the notification to SD-CCF 1102. For example, SD-CTF 1902 finds that the data rate information is desired for collecting the chargeable event that indicates the start of the data transmission (service layer session management function) for sensor data reading. SD-CTF 1902 would require SD-CCF 1102 to configure the charging policy trigger in the underlying 3GPP network, so that any change of data rate regarding the service data flow in 3GPP network would be reported to the service layer 1104.

In step 2 of FIG. 19, the SD-CCF 1102 sends the subscription message to PCRF 1908 in 3GPP network 1906 over Mcn/Rx reference point. The message includes the trigger ID and device's underlying network ID (e.g. external ID to 3GPP network 1906 to indicate the service platform which subscribes the trigger).

In step 3 of FIG. 19, If 3GPP network 1906 changes the sponsored data volume threshold, PCRF 1908 sends the notification to SD-CCF 1102 over Mcn reference point, including the trigger ID, trigger subscription ID and occurrence timestamp. In this example, since the sponsored data volume threshold is changed, 3GPP network 1906 sends the new data volume threshold (e.g. granted-service-unit Attribute Value Pair (AVP)) assuming diameter protocol is used cross 3GPP network 1906 and oneM2M service layer platform 1904.

In step 4 of FIG. 19, upon receiving the trigger notification from 3GPP network 1906, oneM2M service layer 1904 updates the charging policy according to the related charging policy ID attribute in the <chargingCorrelationTrigger> resource. For example, the oneM2M service layer 1904 can change the data rates binding to the charging policy for data retrieval service, or can change sponsored data volume threshold for home surveillance service. More specifically, the change will be made on the oneM2M resources <statsCollect> and <eventConfig>, which are designed for maintain charging policy and chargeable event information, respectively.

In step 5 of FIG. 19, SD-CCF 1902 then notifies the SD-CTF 1902 in other CSFs about the change of the charging policy, i.e. start charging service subscriber extra fee at the new threshold. Specifically, the notification includes service ID, the new applied charging policy ID and related chargeable events ID.

In step 6 of FIG. 19, SD-CTF 1902 will access the resources <statsCollect> and <eventConfig> for more details of collecting charging record by the charging policy ID and event ID.

In step 7 of FIG. 19, as an optional step, SD-CTF 1902 may send a confirmation to SD-CCF 1102 for confirming the change of charging behavior.

It is understood that the entities performing the steps illustrated in FIG. 19 are logical entities that may be implemented in the form of software (i.e., computer-executable instructions) stored in a memory of, and executing on a processor of, a device, server, or other computer system such as one of those illustrated in FIG. 22C or 22D. That is, the method(s) illustrated in FIG. 19 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

Figure 20:
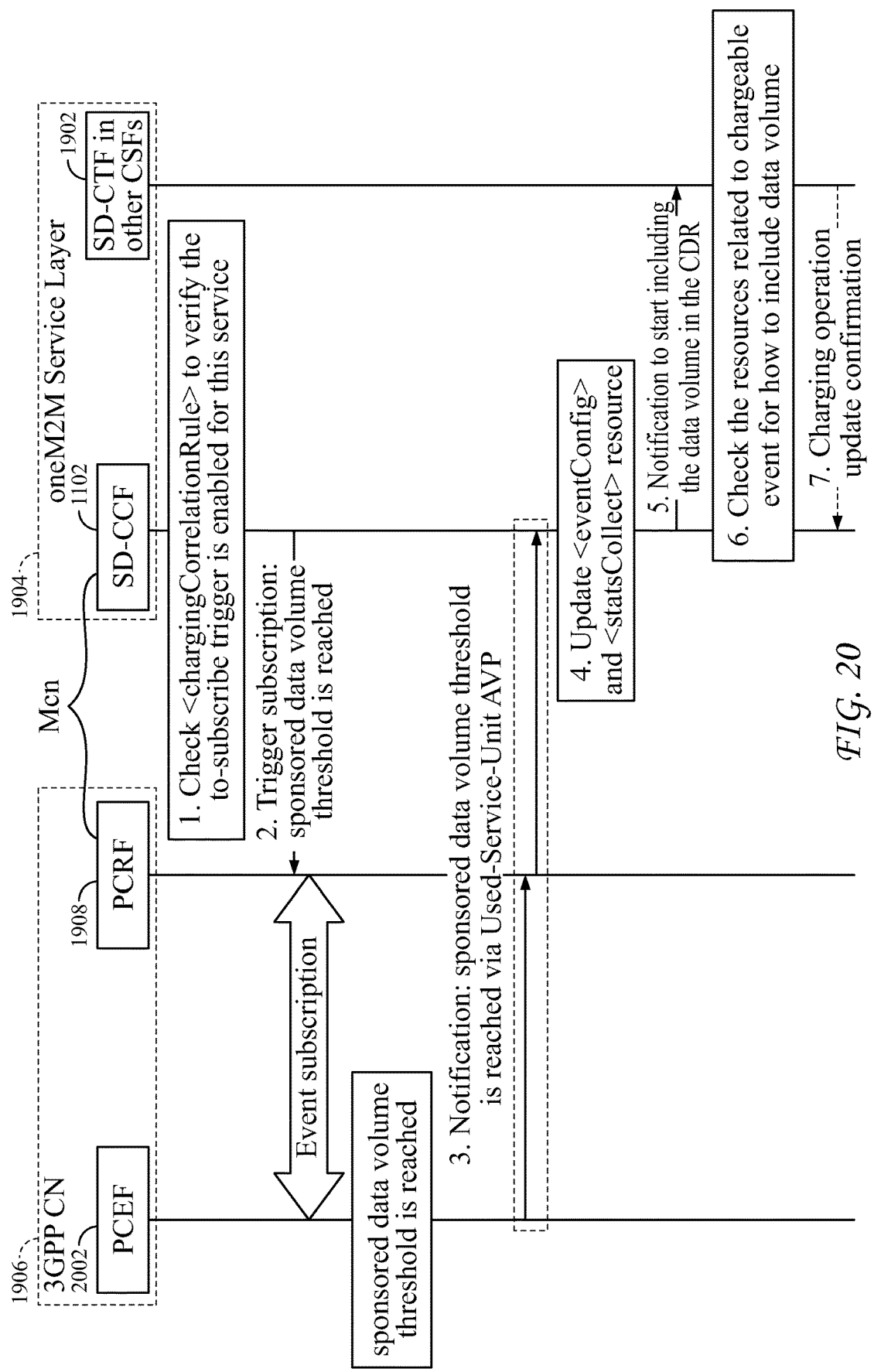
FIG. 20 is a diagram that illustrates an exemplary embodiment of the oneM2M charging information correlation with 3GPP network use case.

FIG. 20 is a diagram that illustrates an exemplary embodiment of the oneM2M charging information correlation with 3GPP network use case that demonstrates how the proposed oneM2M SD-CCF 1102 works to correlate the charging information provided by 3GPP network 1906. Specifically, the sponsored data volume threshold is reached in 3GPP network. Consequently, SD-CCF 1102 decides to apply new charging rate to the future service data flow, and notifies the SD-CTF 1902 to include the data volume when collecting chargeable event for the service.

Step 1 of FIG. 20 is similar to step 1 in FIG. 19. The SD-CCF 1102 checks <chargingCorrelationRule> resource to make sure that the charging information trigger of reaching sponsored data volume threshold is enabled for the service. In addition, SD-CCF 1102 will initiate this step by receiving some information from CTF. More details can be found in description of step 1 in FIG. 19. The only difference is that CTF reports the charging event trigger instead of charging policy trigger there.

Step 2 of FIG. 20 is similar to step 2 in FIG. 19. The SD-CCF 1102 sends the subscription message to PCRF 1908 in 3GPP network over Mcn reference point. The message includes the trigger ID and service provider ID (external ID to 3GPP network to indicate the service platform which subscribes the trigger). PCRF 1908 then notifies PCEF 2002 to subscribe the trigger through Event-trigger AVP.

In Step 3 of FIG. 20, PCEF 2002 once finds out the threshold is reached, and then reports the event of reaching data volume threshold through used-service-unit AVP to indicate the usage measurement volume. In this step, PCEF 2002 first reports to PCRF 1908, and PCRF 1908 sends the event notification to SD-CCF 1102 over Mcn/Rx reference point.

In Step 4 of FIG. 20, SD-CCF 1102 decides to apply the new charging rate for extra data volume and to ask SD-CTF 1902 to include data volume in the charging record. This could be done by updating charging policy and chargeable event on resources <statsCollect> and <eventConfig>.

Step 5-Step 7 of FIG. 20 are similar to steps 5-7 FIG. 19.

It is understood that the entities performing the steps illustrated in FIG. 20 are logical entities that may be implemented in the form of software (i.e., computer-executable instructions) stored in a memory of, and executing on a processor of, a device, server, or other computer system such as one of those illustrated in FIG. 22C or 22D. That is, the method(s) illustrated in FIG. 20 may be implemented in the form of software (i.e., computer-executable instructions) stored in a memory of a computing device, such as for example the device or computer system illustrated in FIG. 22C or 22D, which computer executable instructions, when executed by a processor of the computing device, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

As mentioned above, oneM2M is defining capabilities supported by the oneM2M service layer. These capabilities are referred to as Capability Service Functions (CSFs). The oneM2M service layer is referred to as a Capability Services Entity (CSE).

Figure 21:
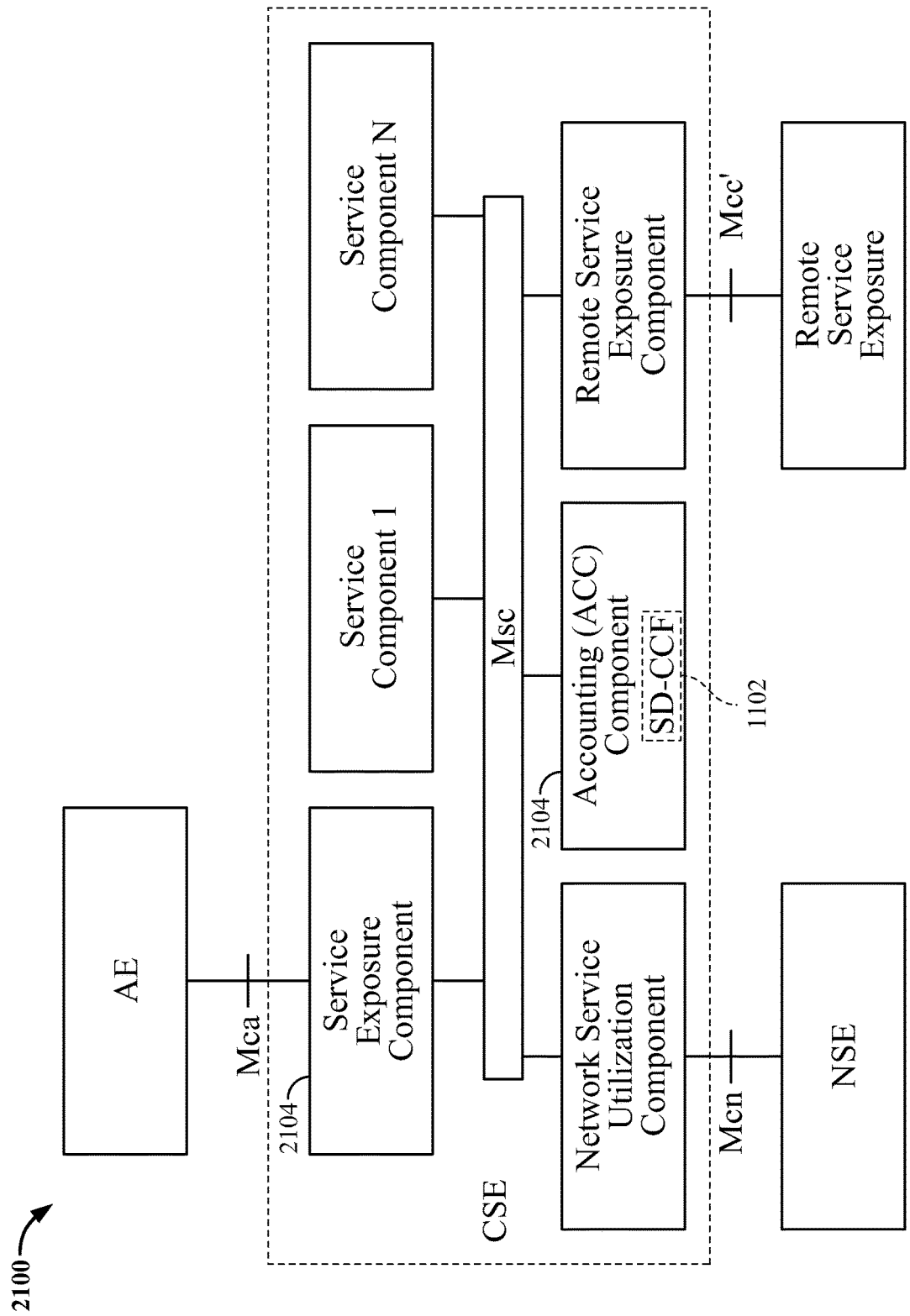
FIG. 21 is a diagram that illustrates an embodiment of proposed SD-CCF 1102 in the oneM2M SoA architecture.

FIG. 21 is a diagram that illustrates an embodiment of proposed SD-CCF 1102 in the oneM2M SoA architecture 2100, where SD-CCF 1102 is inserted as a part of Accounting (ACC) Service Component 2102. Other service components could communicate with SD-CCF 1102 regarding charging correlation issues through Msc reference point. As another embodiment, SD-CCF 1102 could be part of the service exposure component 2104, where SD-CCF 1102 is treated as a common function for other service components and applications.

Interfaces, such as Graphical User Interfaces (GUIs), can be used to assist user to control and/or configure functionalities related to the service layer charging correlation. The Interfaces can be at the device, gateway, or server. A User interface can display when it is triggered to generate chargeable events, and the information elements contained in the charging records. In addition, the API operations can also be displayed, such as the messages exchanged between M2M server and underlying network server.

FIG. 23A is a diagram that illustrates an interface 2302 that allows the user to set charging correlation rules and triggers as well as to view charging correlation rules and triggers. FIG. 23B is a diagram that illustrates an interface 2304 that can be used by a consumer at user equipment. In this example, interface 2304 displays the remaining bandwidth of a sponsored flow. It is to be understood that interfaces 2302 and 2304 can be produced using displays such as those shown in FIGS. 22C-D described below.

Example M2M/IoT/WoT Communication System

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 22B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 22B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304 may be hosted within a M2M service layer instance hosted by an M2M node, such as an M2M server, M2M gateway, or M2M device, as shown in FIG. 22B. For example, the logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 22C or FIG. 22D described below.

Further, logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304 can implemented as part of an M2M network that uses a Service Oriented Architecture (SOA) and/or a Resource-Oriented Architecture (ROA) to access services of the present application.

FIG. 22C is a block diagram of an example hardware/software architecture of a M2M network node 30, such as an M2M device 18, an M2M gateway 14, an M2M server, or the like. The node 30 can execute or include logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304. The device 30 can be part of an M2M network as shown in FIG. 22A-B or part of a non-M2M network. As shown in FIG. 22C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 22D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 22A and FIG. 22B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 22A-B or the device 30 of FIG. 22C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as PCRF 702, 914 and 1908, MTC-IWF 704, PCEF 706, 912 and 2002, charging entity 916, 3GPP CN 910, SD-CS 602, SD-ODS 608, SD-OFCS 606, SD-CTF 610, 1302 and 1902, SD-CCF 1102, M2M application 1108, charging SC 1202, Service Charging and Accounting CSF 1604, Network Service Exposure CSF 1606, 3GPP CN 1906, service layer 904, 1600, 1904, ACC 2104, Service Exposure Component 2104, logic at UE 906 and logic to produce interfaces such as interfaces 2302 and 2304 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method comprising:
   setting, via a service layer residing on a server outside of an underlying 3GPP network, a trigger in the underlying 3GPP network, where the trigger defines an event in the underlying 3GPP network, and where the underlying 3GPP network is configured with functionality to send a notification to the service layer upon detecting the trigger event;
   receiving, from the underlying 3GPP network, the notification the detected trigger event has occurred; and
   performing, at the service layer residing on the server, a service layer charging operation in response to the received notification.

2. The method of claim 1, wherein the trigger is a charging policy trigger.

3. The method of claim 1, wherein the trigger is a charging event trigger.

4. The method of claim 3, wherein the charging event trigger is an indication that the service layer is to update the service layer charging information record (e.g. CDR) or update service layer charging operation.

5. The method of claim 1, wherein the setting of the trigger is done according to a charging correlation rule.

6. The method of claim 1, wherein a Service Domain-Charging Correlation Function (SD-CCF) initiates the setting of the triggers for reporting correlation events.

7. The method of claim 6, wherein the SD-CCF manages a charging correlation rule.

8. The method of claim 7, wherein the charging correlation rule indicates that the trigger is to be set and how to perform the service layer charging correlation.

9. A server in a service layer comprising a processor and a non-transitory memory including computer-executable instructions which, when executed by the processor, cause the server to:
   set, via the server located outside of an underlying 3GPP network, a trigger in the underlying 3GPP network, where the trigger defines an event in the underlying 3GPP network, and where the underlying 3GPP network is configured with functionality to send a notification to the service layer upon detecting the trigger event;
   receive, from the underlying 3GPP network, the notification the detected trigger event has occurred; and
   perform, at the service layer residing on the server, a service layer charging operation in response to the received notification.

10. The server of claim 9, wherein the trigger is a charging policy trigger.

11. The server of claim 9, wherein the trigger is a charging event trigger.

12. The server of claim 11, wherein the charging event trigger is an indication that the service layer is to update a service layer charging information record (e.g. CDR) or update service layer charging operations.

13. The server of claim 9, wherein the setting of the trigger is done according to a charging correlation rule.

14. The server of claim 9, wherein a Service Domain-Charging Correlation Function (SD-CCF) initiates the setting of the trigger.

15. The server of claim 14, wherein the SD-CCF manages a charging correlation rule.

16. The server of claim 15, wherein the charging correlation rule indicates that the trigger is to be set and how to perform a service layer charging correlation.

17. A method comprising:
   receiving, at an underlying 3GPP network, a trigger from a service layer, the service layer residing on a server located outside of the underlying 3GPP network, the trigger defining an event in the underlying 3GPP network, and the underlying 3GPP network being configured with functionality to send a notification to the service layer upon detecting the trigger event;
   producing, at the underlying 3GPP network, the notification based on the detected trigger event occurring; and
   sending, from the underlying 3GPP network, the the notification to the service layer as a result of the detected trigger.

18. An underlying 3GPP network with supported functions that communicates with a service layer for updating charging operations comprising a processor and a non-transitory memory including computer-executable instructions which, when executed by the processor cause the underlying 3GPP network to:
   receive, at the underlying 3GPP network, a trigger from the service layer, the service layer residing on a server located outside of the underlying 3GPP network, the trigger defining an event in the underlying 3GPP network, and the underlying 3GPP network being configured with functionality to send a notification to the service layer upon detecting the trigger event;

produce, at the underlying 3GPP network, the notification based on the detected trigger event occurring; and send, from the underlying 3GPP network, the the notification to the service layer as a result of the detected trigger.

19. The method of claim 1, where the service layer configures the trigger for a group of plural service subscribers and receives the correlation events for the group.

\* \* \* \* \*